US012761443B2

(12) United States Patent
Miller

(10) Patent No.: US 12,761,443 B2
(45) Date of Patent: Oct. 13, 2026

(54) ACTUATOR WITH PARALLELOGRAM SPRING GUIDING STRUCTURE

(71) Applicant: Hutchinson Technology Incorporated, Hutchinson, MN (US)

(72) Inventor: Mark A. Miller, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 187 days.

(21) Appl. No.: 18/817,798

(22) Filed: Aug. 28, 2024

(65) Prior Publication Data

US 2025/0076609 A1 Mar. 6, 2025

Related U.S. Application Data

(60) Provisional application No. 63/536,879, filed on Sep. 6, 2023.

(51) Int. Cl.
*G02B 7/09* (2021.01)

(52) U.S. Cl.
CPC .................................... *G02B 7/09* (2013.01)

(58) Field of Classification Search
CPC . G02B 7/08; G02B 7/021; G02B 7/02; G02B 7/04
See application file for complete search history.

(56) References Cited

U.S. PATENT DOCUMENTS 8,726,732 B2 5/2014 Littler et al.
9,246,017 B2 1/2016 van der Heide et al.
2009/0284853 A1* 11/2009 Griffiths .............. G02B 21/241 359/822
2012/0287318 A1 11/2012 Fujinaga et al.
2017/0176768 A1 6/2017 Kim
2017/0306676 A1* 10/2017 Girotto .................. E05D 15/56
2019/0129132 A1 5/2019 Fan et al.
2020/0323140 A1* 10/2020 Gielis .................... A01D 46/24
2020/0340188 A1* 10/2020 Ganz ...................... B61D 3/04
2022/0128046 A1 4/2022 Ruzicka et al.

FOREIGN PATENT DOCUMENTS

WO 2005/003834 A1 1/2005

OTHER PUBLICATIONS

International Search Report and Written Opinion in International Application No. PCT/US2024/044882, mailed Dec. 11, 2024.

* cited by examiner

*Primary Examiner* — Van N Chow
(74) *Attorney, Agent, or Firm* — DLA Piper LLP (US)

(57) ABSTRACT

The present embodiments relate to an actuator that includes a parallelogram spring guiding structure. The actuator can include a base and a moving carriage configured to move in a direction (e.g., Z direction). The parallelogram spring guiding structure can be fixed to the moving carriage and the base. Further, the parallelogram spring guiding structure can include side lengths and flexible hinge areas configured to flex as the moving carriage is actuated, preventing or mitigating unwanted motion of the moving carriage during actuation.

26 Claims, 42 Drawing Sheets

ACTUATOR WITH PARALLELOGRAM SPRING GUIDING STRUCTURE

CROSS-REFERENCE TO RELATED APPLICATIONS

This application claims the benefit of, and priority to, U.S. Provisional Application No. 63/536,879 filed on Sep. 6, 2023, which is hereby incorporated by reference in its entirety.

FIELD

The invention relates generally to an actuator, and more particularly, to an actuator with a parallelogram spring guiding structure to limit unwanted motion of the moving carriage configured to move due to actuation by actuator.

BACKGROUND

An actuator can be used in a variety of contexts. For example, an actuator can move a lens back and forth to focus the lens as part of an autofocus system. In many cases, it can be desirable to move a moving component in a desired direction (e.g., a Z direction) to increase efficiency in implementing such an autofocus system.

However, many actuator designs may cause movement of the moving component in directions other than the desired direction (e.g., pitch, yaw, roll). Such adverse motions can cause stress in the actuator, such as these forces adding unwanted torque and out of plane bending forces on the actuator.

Therefore, improvements in actuator design are needed, such as for example an actuator with a design that constrains unwanted movement (such as for example pitch, yaw, tilt) during Z-motion of a payload.

SUMMARY

The present embodiments relate to an actuator that includes a parallelogram spring guiding structure. The actuator can include a base and a moving carriage configured to move in a direction (e.g., Z direction). The parallelogram spring guiding structure can be fixed to the moving carriage and the base. Further, the parallelogram spring guiding structure can include side lengths and flexible hinge areas configured to flex as the moving carriage is actuated, preventing or mitigating unwanted motion of the moving carriage during actuation.

In a first example embodiment, a system is provided. The system can include an actuator, such as but not limited to a bimorph type actuator, and a moving carriage configured to move in response to actuation by the bimorph actuator. The system can also include a base configured to remain static.

The system can also include a first parallelogram guiding structure. The first parallelogram guiding structure can include a first end connected to the moving carriage and a second end connected to the static base. The first parallelogram guiding structure can also include a set of side lengths connecting the first end to the second end. The first parallelogram guiding structure can be configured to flex with the moving carriage such that an orientation of the first end remains substantially in parallel with an orientation of the second end.

In some instances, the first parallelogram guiding structure further comprises a set of flexible hinge areas formed between the set of side lengths and each of the first end and second end. The flexible hinge areas can be configured to flex as the moving carriage is actuated.

In some instances, the set of flexible hinge areas include a width less than a width of the set of side lengths.

In some instances, the first parallelogram guiding structure is disposed at a first side of the moving carriage and the static base, and wherein a second parallelogram guiding structure is disposed at a second side of the moving carriage and the static base.

In some instances, the first parallelogram guiding structure comprises an outer parallelogram guiding structure. The system can further comprise an inner parallelogram guiding structure. The inner parallelogram guiding structure can include a first end connected to the outer parallelogram guiding structure at the second end of the outer parallelogram guiding structure and a second end connected to a static endpoint. The inner parallelogram guiding structure can also include a set of side lengths disposed between the first end and the second end. The outer parallelogram guiding structure and the inner parallelogram guiding structure together can provide multiple motion arcs as the moving carriage actuates.

In some instances, the moving carriage comprises a lens carriage configured to receive a lens as part of an autofocus system.

In some instances, the bimorph actuator comprises a beam including a first end fixed to the static base and a second end comprising a free end and connected to the moving carriage and a shape metal alloy (SMA) material disposed along the beam between the fixed end and the free end.

In some instances, the device comprises three parallelogram spring structures each disposed on different sides of the moving carriage.

In some instances, a set of inlets are formed into each of the first end and the second end of the first parallelogram guiding structure.

In some instances, the system can include the moving carriage comprising an upper lens carriage configured to hold a first lens. The bimorph actuator can be connected to the upper lens carriage. The system can also include a lower lens carriage configured to hold a second lens. A second bimorph actuator can be connected to the lower lens carriage. A stroke distance of the upper lens carriage can be greater than a stroke distance of the lower lens carriage.

In another example embodiment, a parallelogram guiding structure for an actuator is provided. The parallelogram guiding structure can include a first end configured to connect to a moving carriage and a second end configured to connect to a static base. The parallelogram guiding structure can also include a set of side lengths including first side length and a second side length that each extend between the first end to the second end. The parallelogram guiding structure can also include a set of flex hinge areas formed between each of the set of side lengths and the first end and the second end. The set of flex hinge areas can be configured to flex as the first end moves with the moving carriage such that an orientation of the first end remains substantially in parallel with an orientation of the second end.

In some instances, the set of flexible hinge areas include a width less than a width of the set of side lengths.

In some instances, the first parallelogram guiding structure comprises an outer parallelogram guiding structure. The first parallelogram guiding structure further comprises an inner parallelogram guiding structure. The inner parallelogram guiding structure can include a first end connected to the outer parallelogram guiding structure at the second end of the outer parallelogram guiding structure. The inner parallelogram guiding structure can also include a second end connected to a static endpoint. The inner parallelogram guiding structure can also include a set of side lengths disposed between the first end and the second end. The outer parallelogram guiding structure and the inner parallelogram guiding structure together provide multiple motion arcs as the moving carriage actuates.

In some instances, a set of inlets are formed into each of the first end and the second end of the first parallelogram guiding structure.

In another example embodiment, a device provided. The device can include a moving carriage configured to move in response to actuation by an actuator and a base configured to remain static. The device can also include an outer parallelogram guiding structure comprising a first end connected to the moving carriage and a second end connected to the static base. The outer parallelogram guiding structure can also include a set of side lengths connecting the first end to the second end.

The device can also include an inner parallelogram guiding structure. The inner parallelogram guiding structure can include a first end connected to the outer parallelogram guiding structure at the second end of the outer parallelogram guiding structure and a second end connected to a static endpoint. The inner parallelogram guiding structure can also include a set of side lengths disposed between the first end and the second end.

In some instances, the inner parallelogram guiding structure and the inner parallelogram guiding structure further comprise a set of flexible hinge areas formed between the set of side lengths and each of the first end and second end of each of the inner parallelogram guiding structure and the inner parallelogram guiding structure. The flexible hinge areas can be configured to flex as the moving carriage is actuated.

In some instances, the set of flexible hinge areas include a width less than a width of the set of side lengths.

In some instances, a first set of the inner parallelogram guiding structure and the inner parallelogram guiding structure is disposed at a first side of the moving carriage and the static base. Further, a second set of the inner parallelogram guiding structure and the inner parallelogram guiding structure is disposed at a second side of the moving carriage and the static base.

In some instances, the moving carriage comprises a lens carriage configured to receive a lens as part of an autofocus system.

In some instances, a set of inlets are formed into each of the first end and the second end of each of the inner parallelogram guiding structure and the inner parallelogram guiding structure.

Other features and advantages of embodiments of the present invention will be apparent from the accompanying drawings and from the detailed description that follows.

BRIEF DESCRIPTION OF THE DRAWINGS

Embodiments of the present invention are illustrated, by way of example and not limitation, in the figures of the accompanying drawings, in which like references indicate similar elements and in which.

DETAILED DESCRIPTION

The present embodiments relate to an actuator that includes a parallelogram spring guiding structure. The actuator can include a base and a moving carriage configured to move in a direction (e.g., Z direction). The parallelogram spring guiding structure can be fixed to the moving carriage and the base. Further, the parallelogram spring guiding structure can include side lengths and flexible hinge areas configured to flex as the moving carriage is actuated, preventing or mitigating unwanted motion of the moving carriage during actuation.

In at least some instances, the present embodiments provide an actuator with a parallelogram spring guiding structure. The parallelogram spring structure can be shaped in a parallelogram shape or similar shape (e.g., rectangular) and can be attached to at least two sides of the moving carriage. The moving carriage can be pushed up and down by an actuator (e.g., a shape memory alloy (SMA) actuator) as described herein. Further, tilt of the moving carriage during actuation in the Z direction can be constrained due to the parallelogram guiding springs. The constraining of the tilt can prevent unwanted movement of the moving carriage outside of the Z direction, which can prevent unwanted stress on various parts of the actuator.

The parallelogram spring guiding structure can include equal opposing length sides. Further, the structure can include multiple (e.g., four) flexible hinge areas of similar or equal stiffness. The moving end of the structure can remain parallel to the static end as the moving carriage moves in the positive/negative Z direction.

Figure 1A:
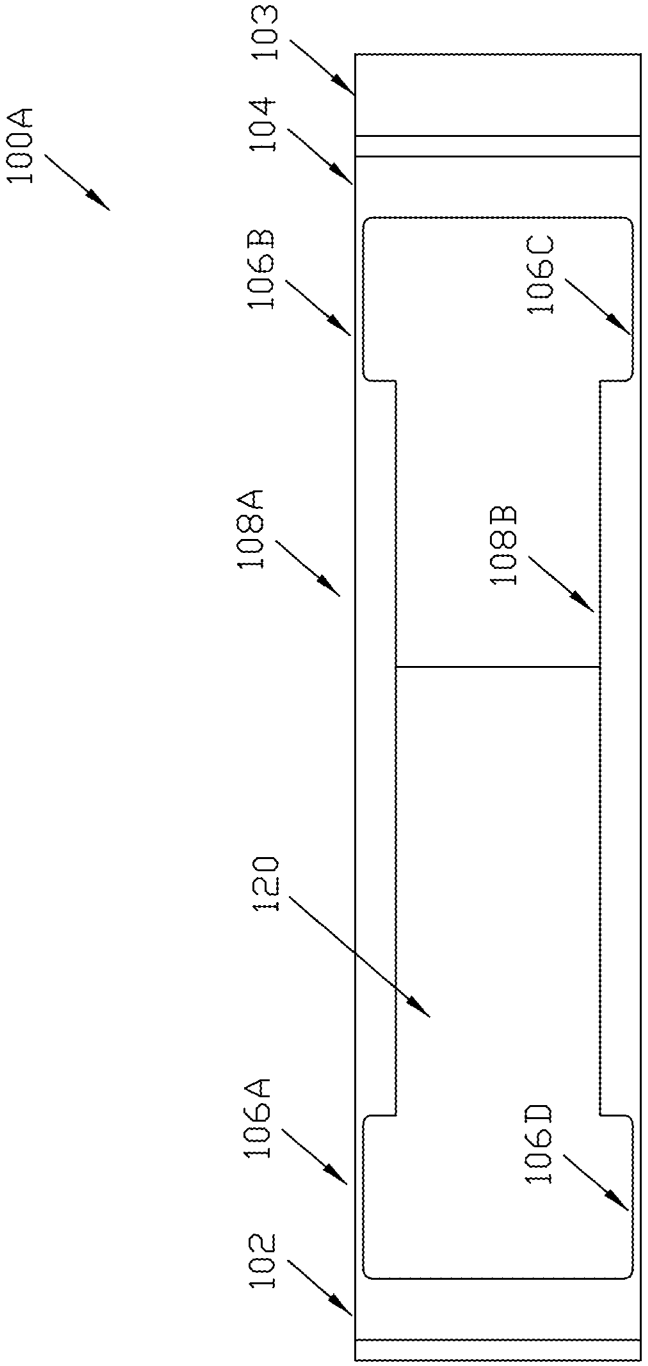
FIGS. 1A-1D illustrate various views of an actuator with a parallelogram spring guiding structure according to some embodiments.

FIGS. 1A-1D illustrate various views 100A-D of an actuator with a parallelogram spring guiding structure. FIG. 1A is a side view 100A of an actuator that includes a parallelogram spring guiding structure. The parallelogram spring guiding structure can include a first end 102 affixed to a moving carriage 120 and a second end 104 affixed to a static base 130 of the actuator. As the moving carriage 120 is moved due to one or more actuators, the first end 102 can move with the moving carriage while the second end remains static and oriented in parallel with the first end.

Figure 1B:
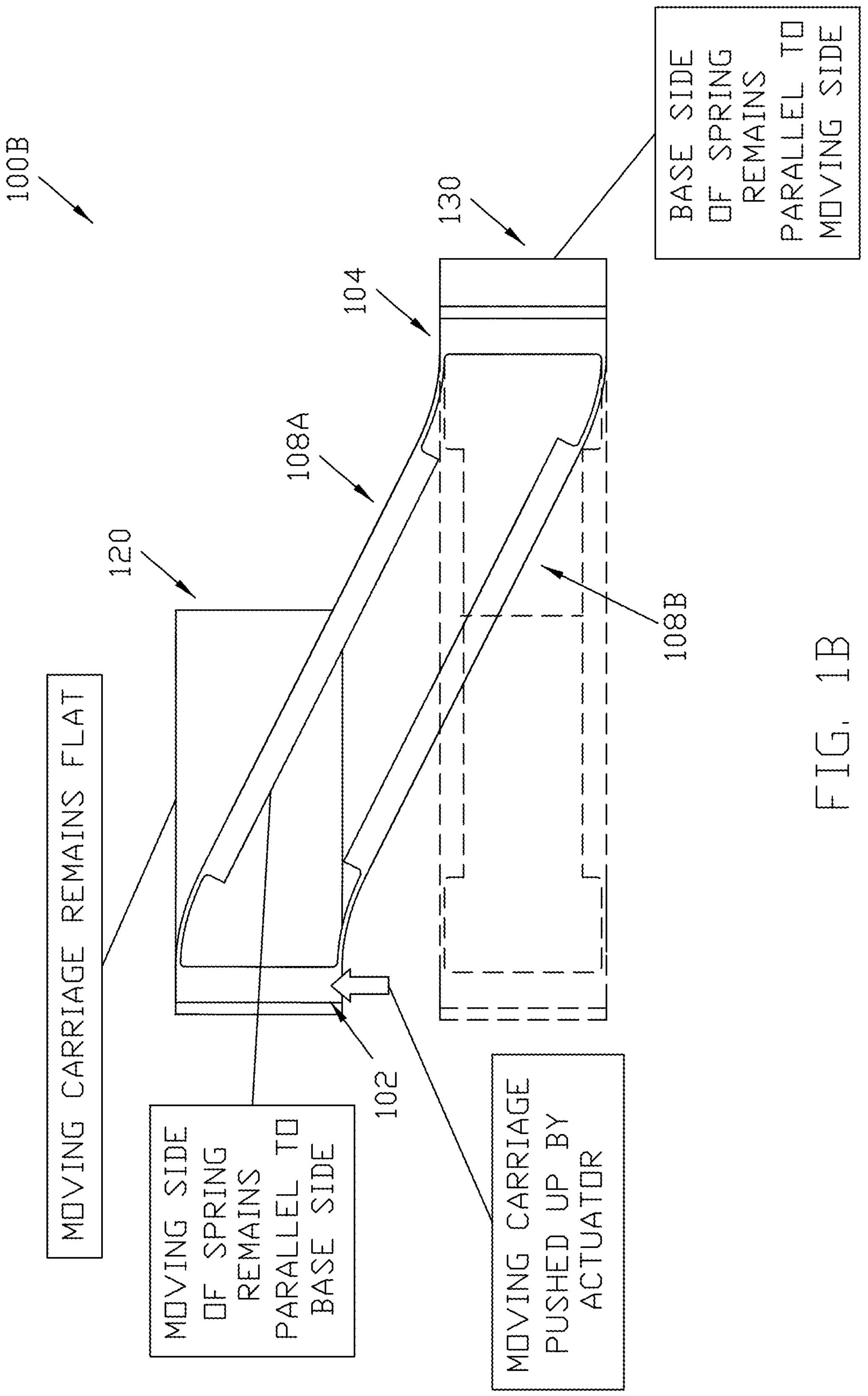

The parallelogram spring guiding structure can further include multiple flexible hinges 106A-D. The hinges 106A-D can be flexible and can allow for flexible movement of side lengths 108A-B as the first end 102 moves with moving carriage 120. For instance, FIG. 1B is a view 100B of an example actuator with a moving carriage 120 moved into an actuated position. The actuated position can include the moving carriage 120 moved in a positive or negative Z direction while remaining substantially flat.

As shown in FIG. 1B, in the actuated position, the first end 102 of the structure can move with the moving carriage 120 as the second end 104 remains affixed to the base 130 and remains parallel with the first end 102. Further, flex hinges 106A-D can flex to allow side lengths 108A-B to be disposed at an angle connecting the first end 102 and second end 104.

Figure 1C:
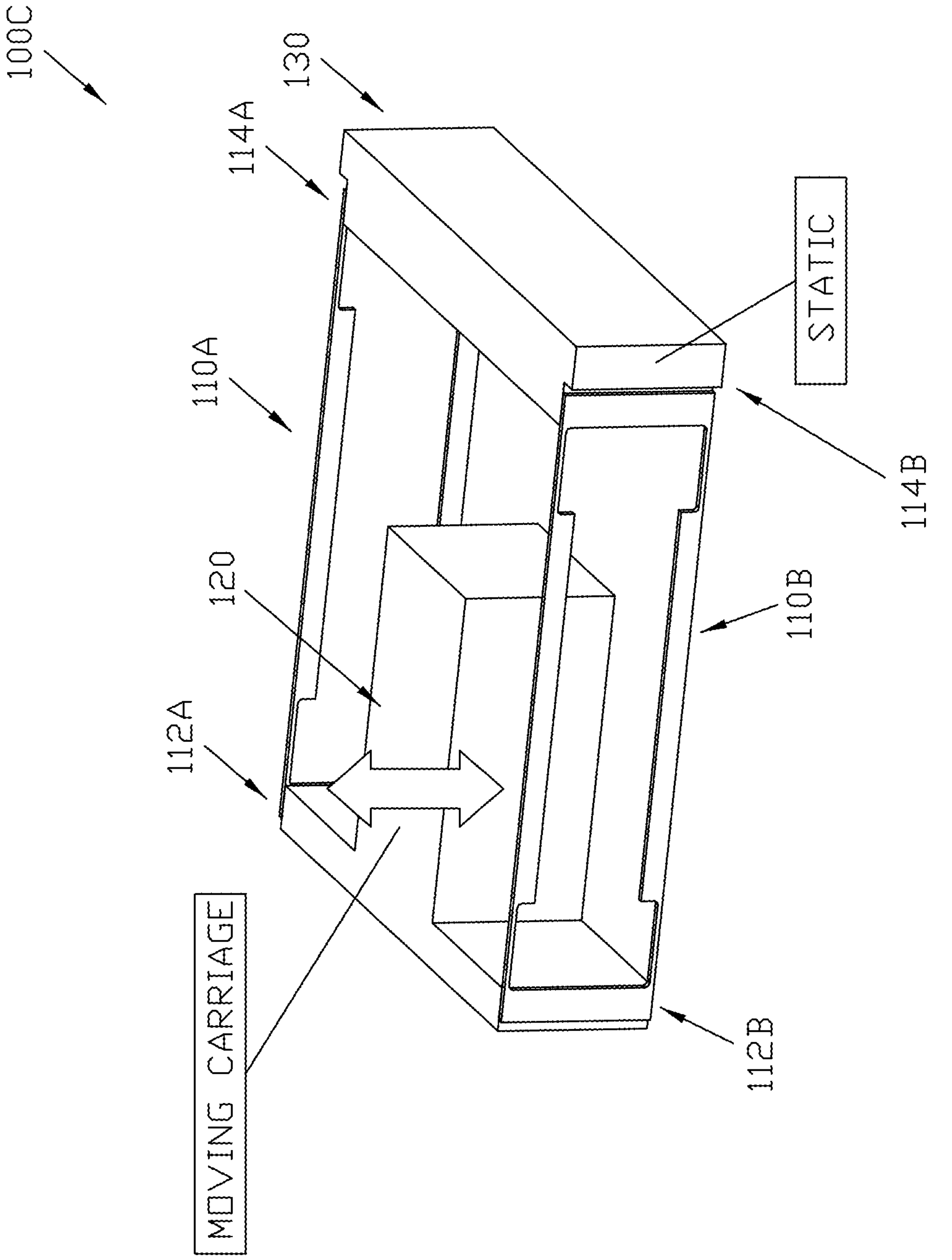

FIG. 1C is a perspective view 100C of an actuator with a moving carriage 120, static base 130, and multiple parallelogram spring guiding structures 110A-B. For instance, a first parallelogram spring guiding structure 110A can be disposed at a first side of the actuator and a second parallelogram spring guiding structure 110B can be disposed at a second side opposite that of the first side. Each parallelogram spring guiding structure 110A-B can include a first end 112A-B connected to the moving carriage 120 and a second end 114A-B connected to the static base 130. As the moving carriage 120 moves in the Z direction, both parallelogram spring guiding structures 110A-B can flex as described with respect to FIG. 1B, for example.

Figure 1D:
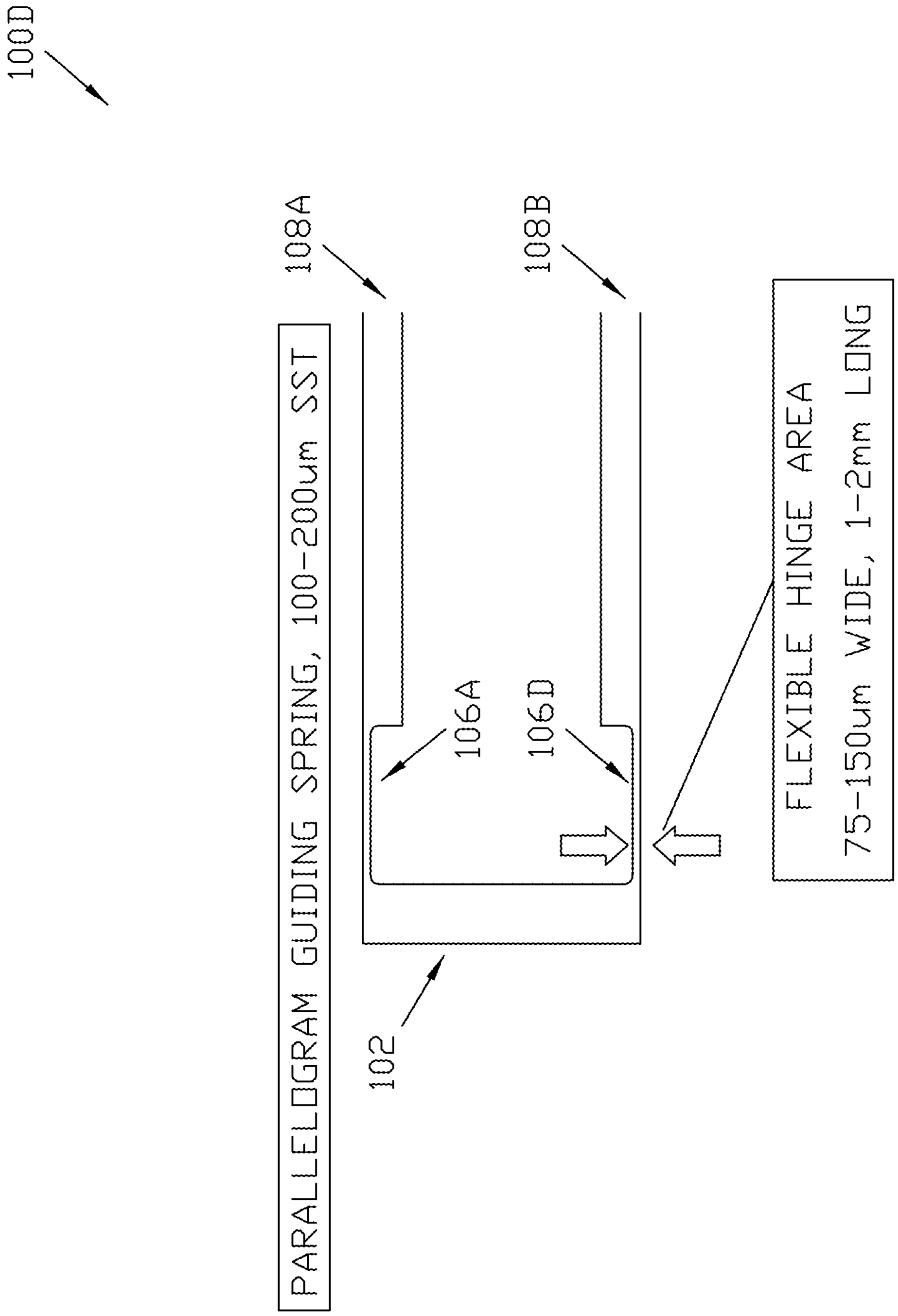

FIG. 1D is a view 100D of a first end of a parallelogram spring guiding structure. The parallelogram spring guiding structure can include a metallic (stainless steel (SST)) material with a thickness of around 100-200 um. The flexible hinge areas 106A-D can include a thickness less than that of the end 102 or side lengths 108A-B. For instance, flexible hinge areas 106A, 106D can include a width of between about 75-150 um and a length of between about 1-2 mm.

In some instances, an actuator can include a double parallelogram spring guiding structure. The double parallelogram spring guiding structure can include two connected parallelogram shaped springs and attached to both the static base and the moving carriage. Each of the spring structures can be connected that can allow for movement of each spring structure as the moving carriage moves in the Z direction.

Figure 2A:
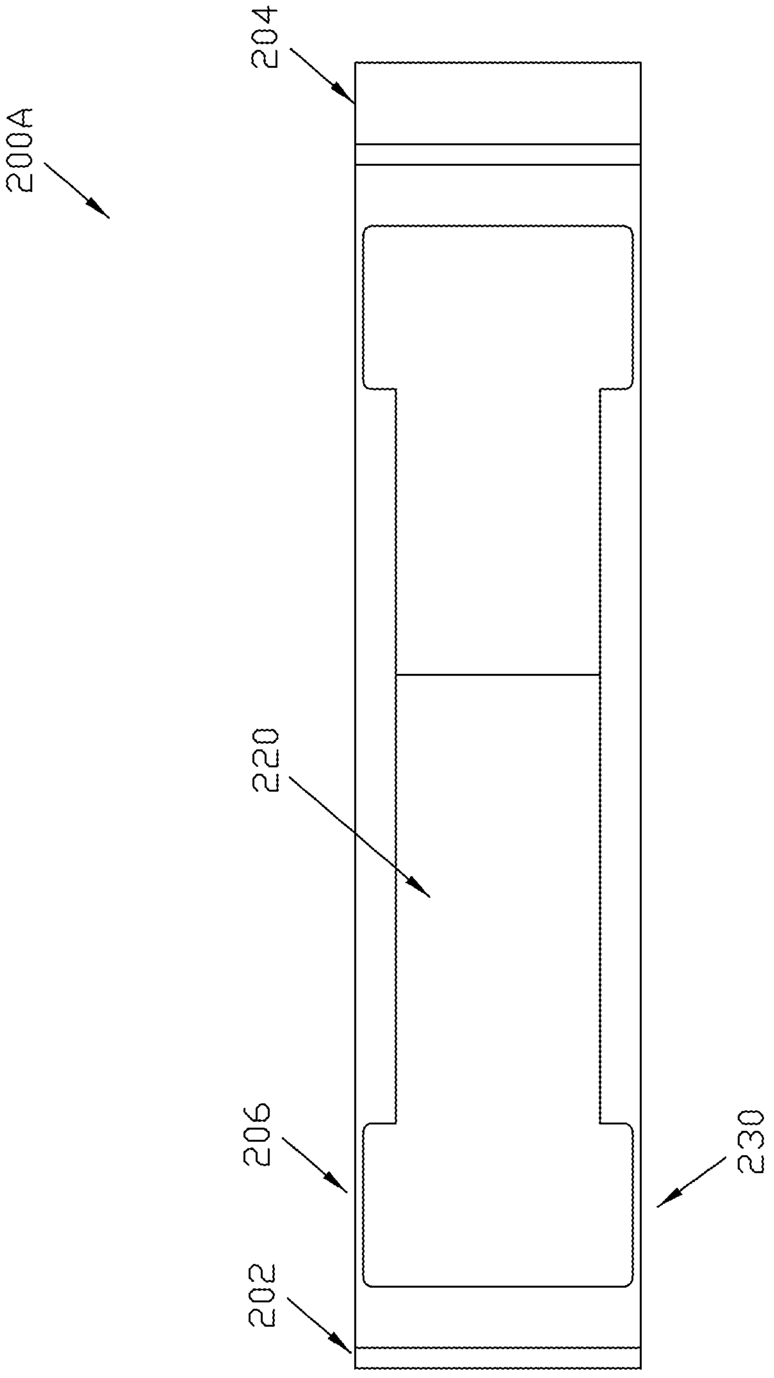
FIGS. 2A-2E illustrate various views of a double parallelogram spring guiding structure according to some embodiments.

FIGS. 2A-2E illustrate various views 200A-E of a double parallelogram spring guiding structure. For instance, FIG. 2A is a view 200A of an example double parallelogram spring guiding structure in an unactuated position. As shown in FIG. 2A, the double parallelogram spring guiding structure can include a first end 202 connected to a moving carriage 220. The double parallelogram spring guiding structure can also include a connector 204 connecting a first parallelogram spring guiding structure to a second parallelogram spring guiding structure coupled to one another. The double parallelogram spring guiding structure can also be fixed to a static base 206.

Figure 2B:
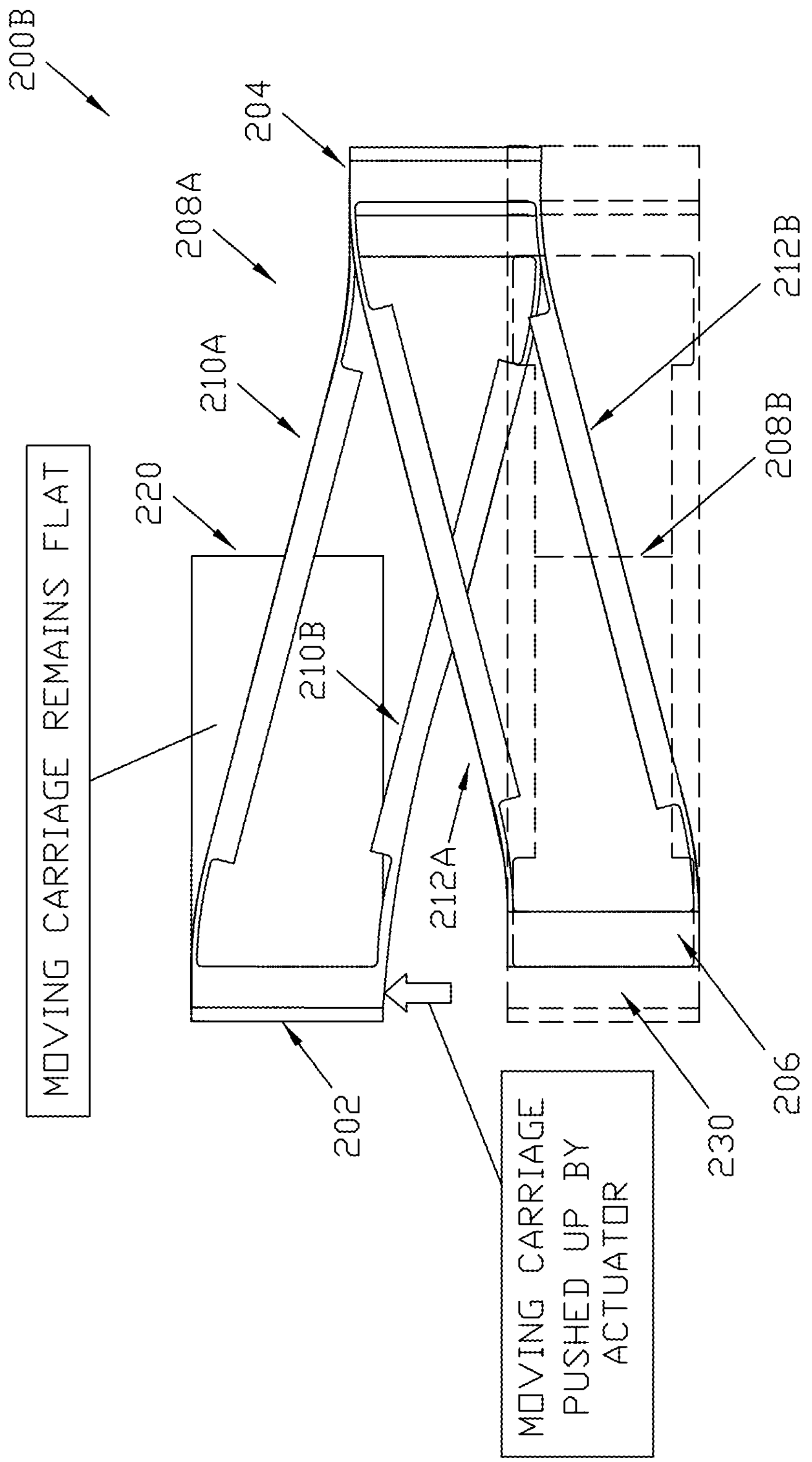

FIG. 2B is a view of a double parallelogram spring guiding structure in an actuated position. As shown in FIG. 2B, a moving carriage 220 can move to an actuated position (e.g., in the positive Z direction). Further, it can be seen that a first parallelogram spring guiding structure 208A and a second parallelogram spring guiding structure 208B can expand. For instance, a first end of the first parallelogram spring guiding structure 208A can be affixed to the moving carriage, while a second end of the parallelogram spring guiding structure 208A can connect to the second parallelogram spring guiding structure 208B at 204. A second end of the second parallelogram spring guiding structure 208B can end at static base 230. Further, side lengths of the first parallelogram spring guiding structure (e.g., 210A-B) and side lengths of the second parallelogram spring guiding structure (e.g., 212A-B) can flex as the moving carriage 220 moves as described herein.

Figure 2C:
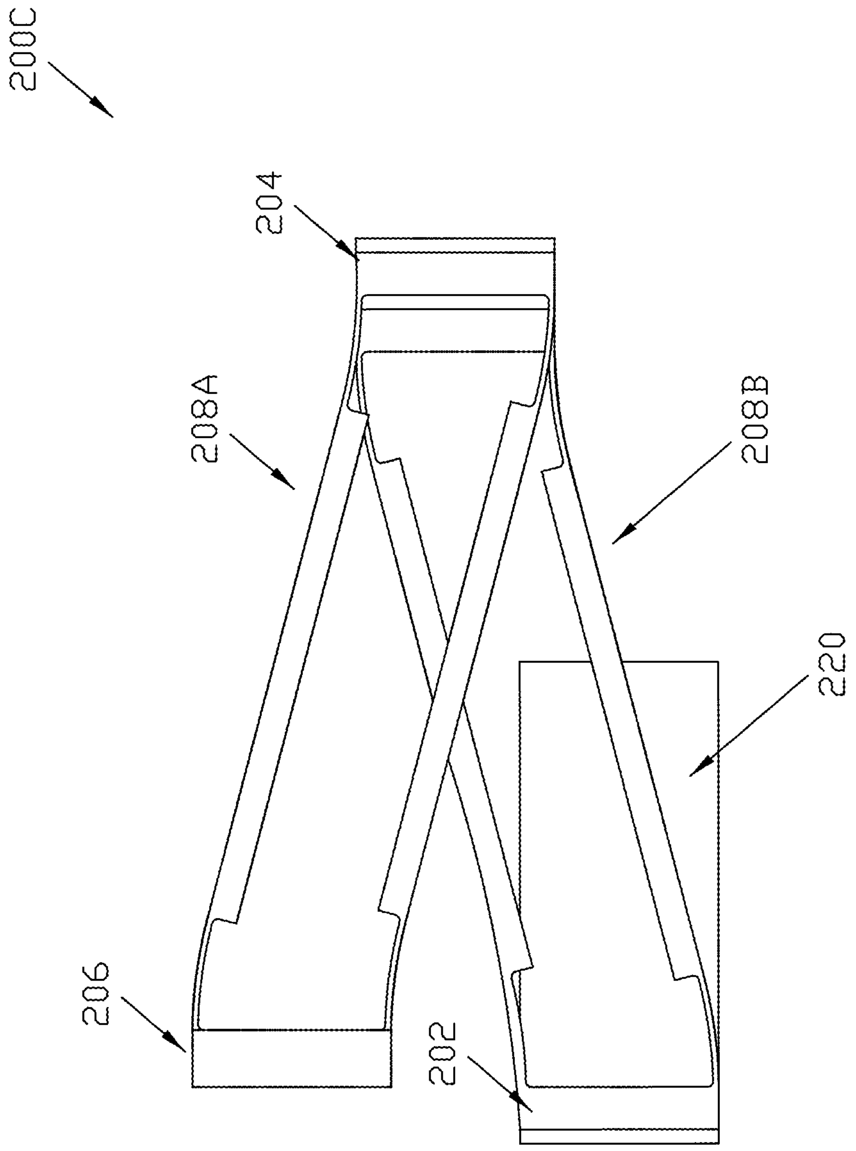

FIG. 2C is a view 200C of a double parallelogram spring guiding structure in a second actuated position (e.g., actuated in a negative Z direction). The first parallelogram spring guiding structure 208A and second parallelogram spring guiding structure 208B can flex in a downward direction, as shown in FIG. 2C.

Figure 2D:
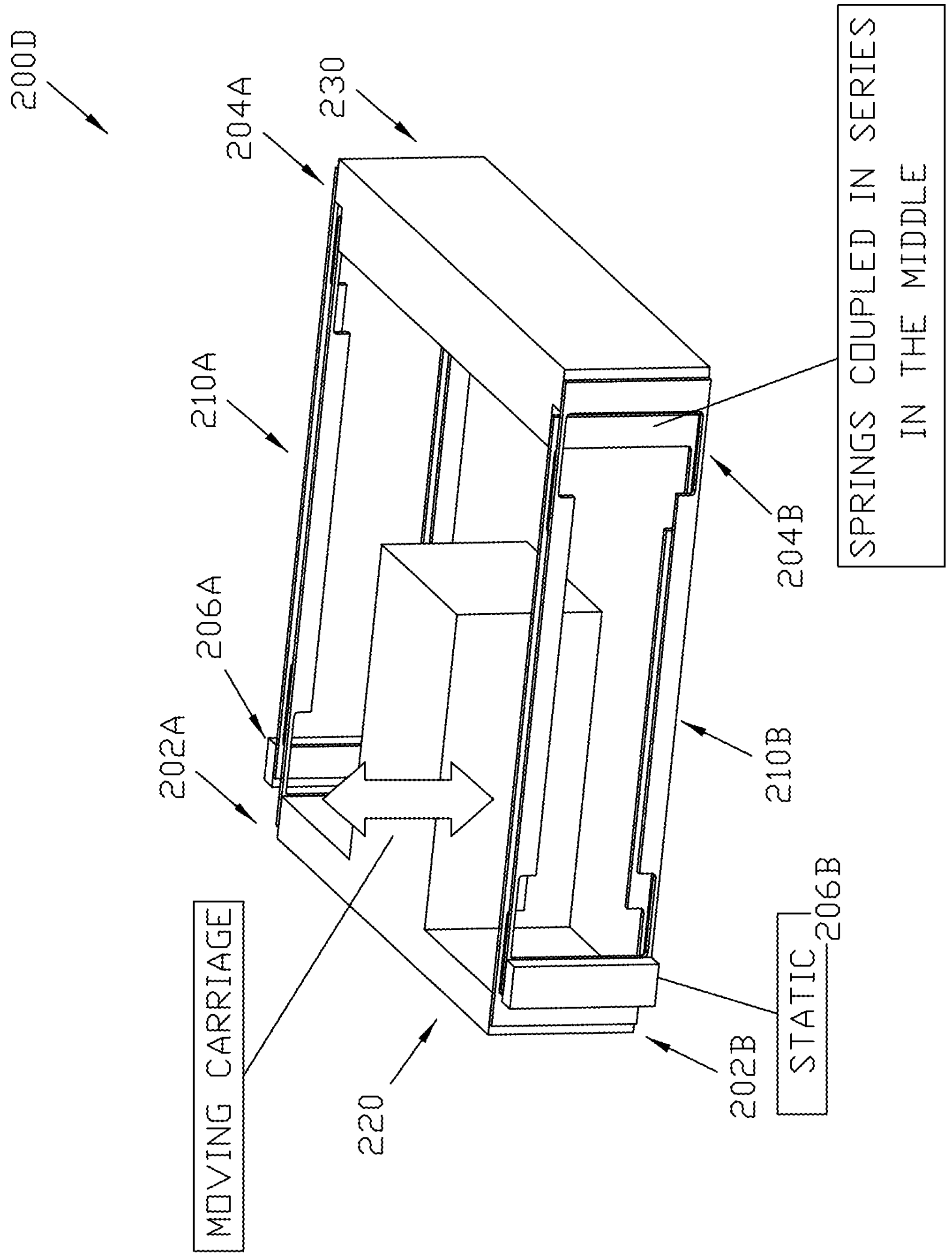

FIG. 2D is a view 200D of an example actuator 200D with multiple double parallelogram spring guiding structures 210A-B. As shown in FIG. 2D, the first double parallelogram spring guiding structure 210A and a second double parallelogram spring guiding structure 210B can have ends 202A, 202B connected to a moving carriage 220. The structures 210A-B can also include second ends 206A-B connected at a static endpoint. Further, structures 210A-B can include connectors 204A-B connected at base 230.

Figure 2E:
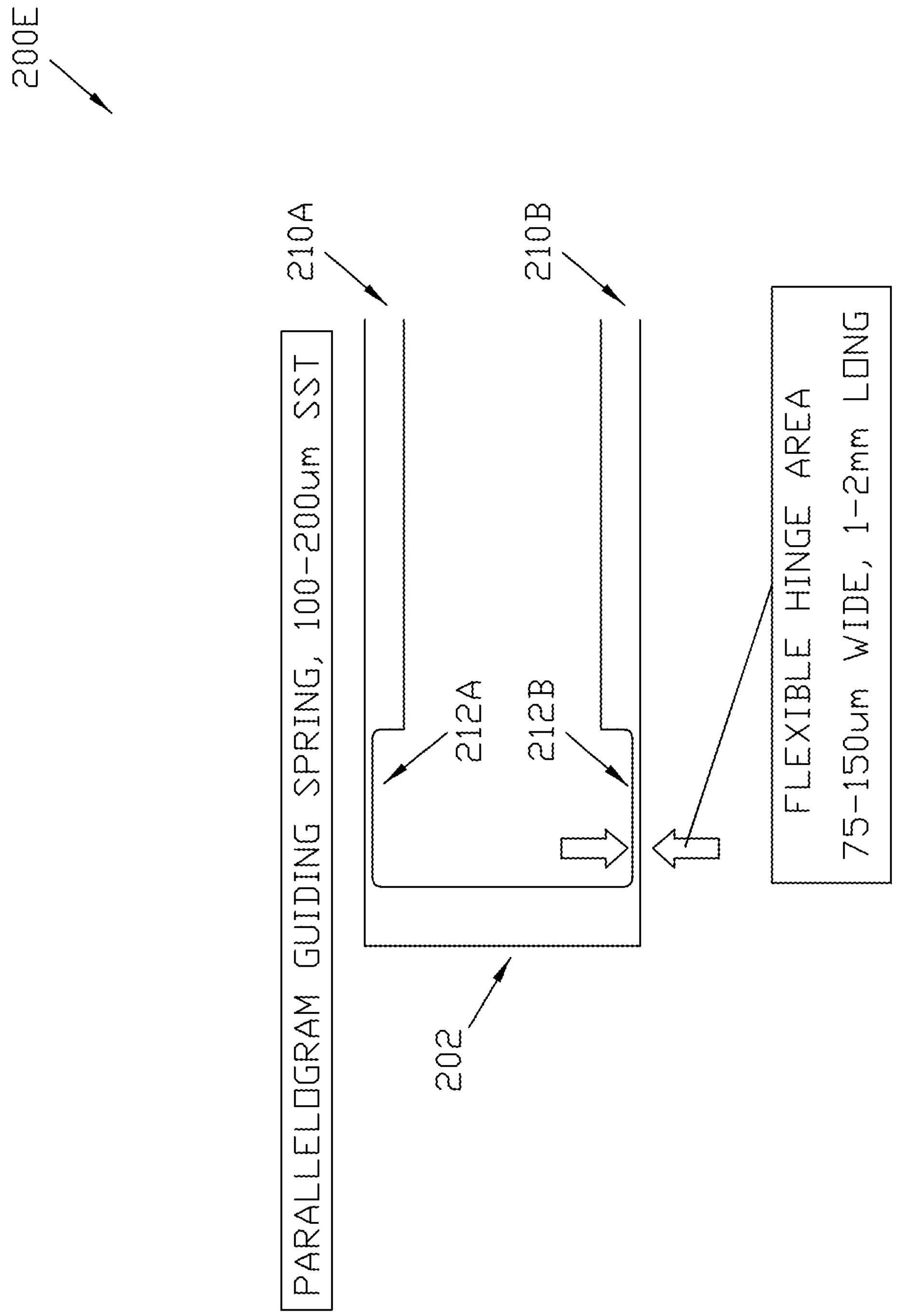

FIG. 2E is a view 200E of a first end of a parallelogram spring guiding structure. The parallelogram spring guiding structure can include a metallic (stainless steel (SST)) material with a thickness of around 100-200 um. The flexible hinge areas 212A-B can include a thickness less than that of the end 102 or side lengths 210A-B. For instance, flexible hinge areas 212A-B can include a width of between about 75-150 um and a length of between about 1-2 mm.

Figure 3A:
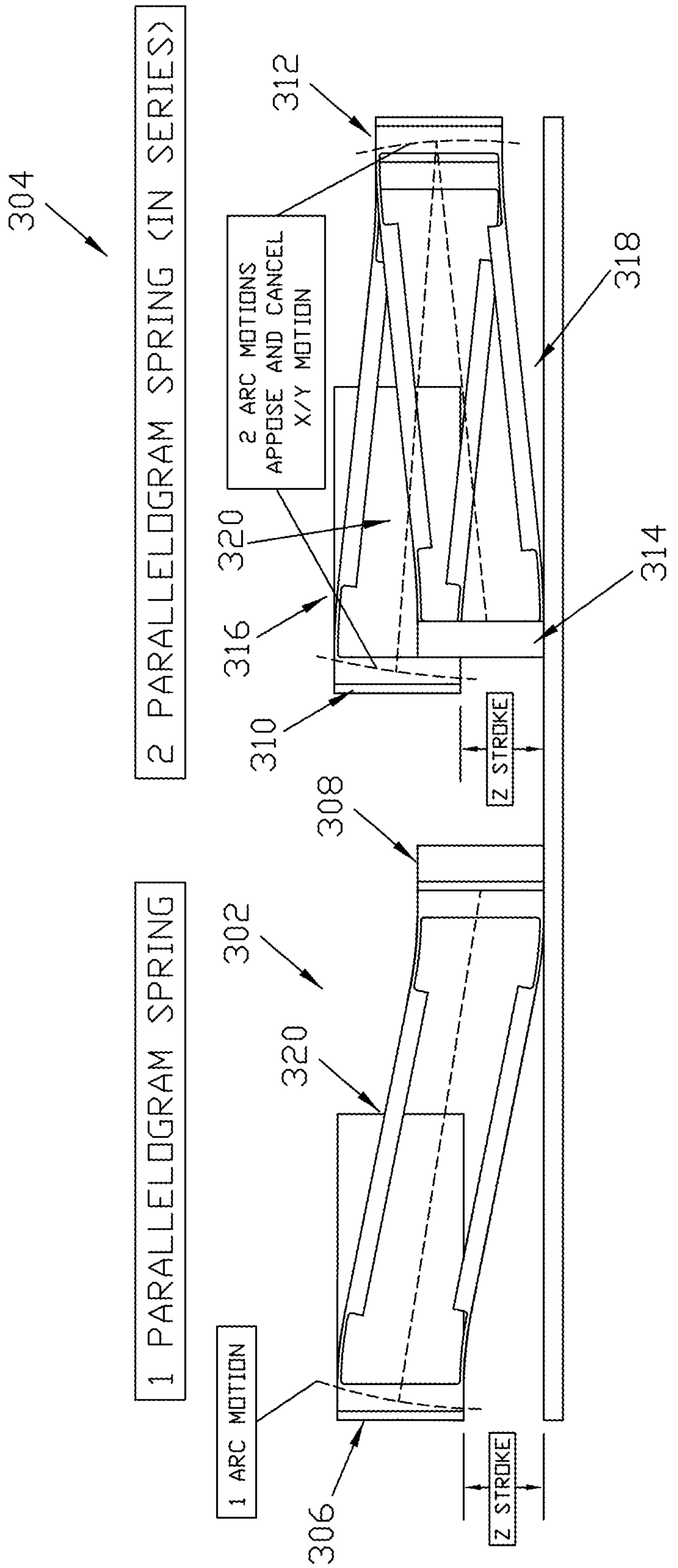
FIGS. 3A-B illustrates example arc motions of both a single parallelogram spring guiding structure and a second parallelogram spring guiding structure according to some embodiments.

The single parallelogram spring guiding structure and the double parallelogram spring guiding structure as described herein can have various motions as the moving carriage moves. FIG. 3A illustrates example arc motion of both a single parallelogram spring guiding structure and a second parallelogram spring guiding structure.

For instance, a single parallelogram spring guiding structure can have a single arc motion due to the single parallelogram spring guiding structure. As shown in FIG. 3A, the single parallelogram spring guiding structure actuator 302 can have a single arc motion at the first end 306 as the moving carriage 320 moves (specified by Z stroke).

Further, the double parallelogram spring guiding structure can have two arc motions that oppose one another and cancel out unwanted (X/Y) motion. In FIG. 3A, the double parallelogram spring guiding structure actuator 304 can include structures 316, 318 that provide two arc motions that oppose and cancel unwanted motion as the moving carriage 320 moves based on the Z stroke. The double parallelogram spring guiding structure actuator 304 can include a first end 310 connected to the moving carriage 320, a second end 314 connected to a static element, and a connector 312 connecting structures 316, 318.

Figure 3B:
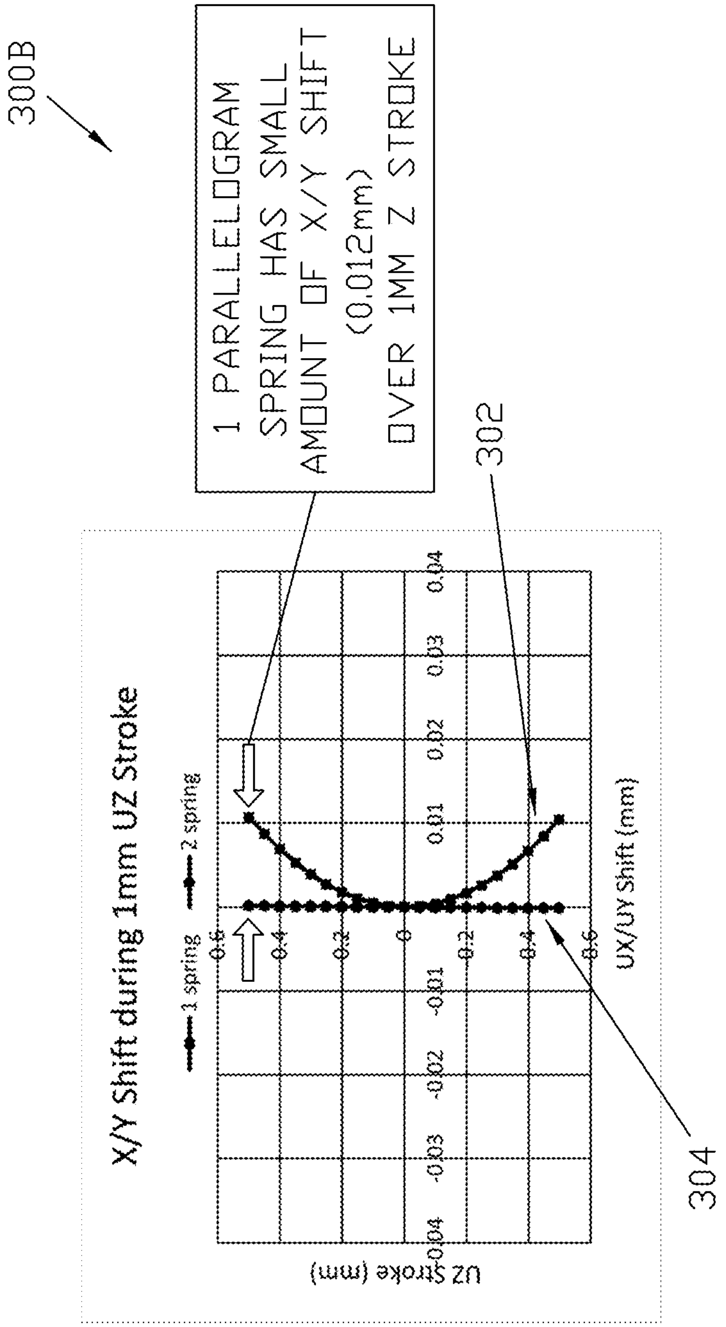

It can be beneficial to minimize or remove unwanted X/Y motion during Z stroke of the actuator. FIG. 3B is an example graphical representation 300B of X/Y shift of multiple parallelogram spring guiding structure actuators. For instance, as shown in graph 300B, during a 1 mm Z stroke, a single parallelogram spring guiding structure actuator 302 can have a small amount of X/Y shift (e.g., 0.012 mm) over the 1 mm Z stroke. Further, a double parallelogram spring guiding structure actuator (e.g., 304) can have around zero shift during the Z stroke.

In some embodiments, the parallelogram spring guiding structure as described herein can be used as part of an SMA bimorph autofocus actuator. Particularly, one or more bimorph actuators can actuate the moving carriage as described herein. A bimorph actuator is described in greater detail with respect to FIGS. 17A-C.

In a first example, a single parallelogram guiding spring actuator is described. The actuator can include single guiding spring structures on three sides of the actuator. The structures on three sides can be used to constrain pitch, yaw, and roll tilt of the actuator. Further, two SMA Bimorph actuators can be configured to push carriage up and down.

Figure 4A:
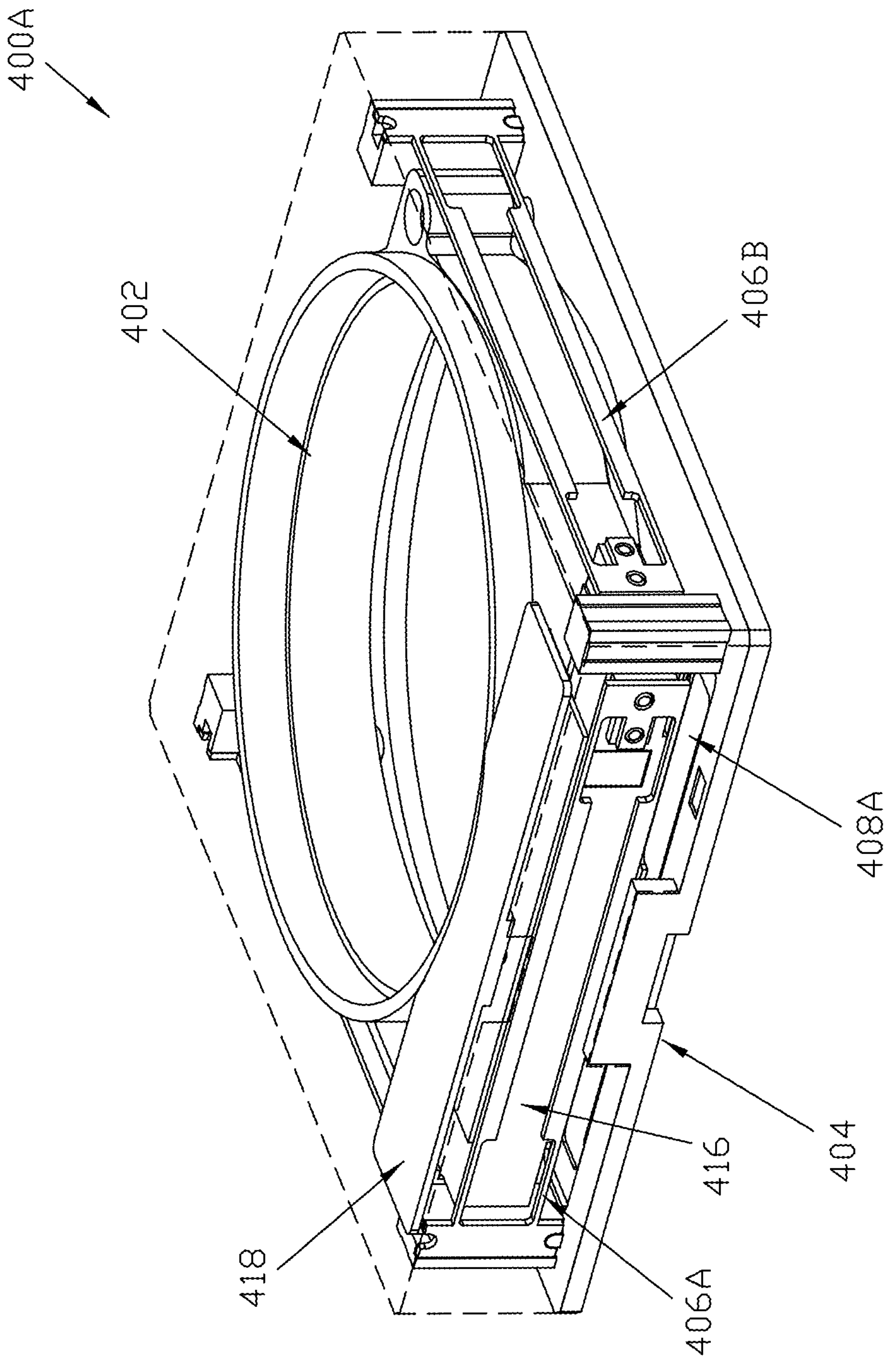
FIGS. 4A-4B illustrate views of a single parallelogram guiding spring actuator according to some embodiments.
Figure 4B:
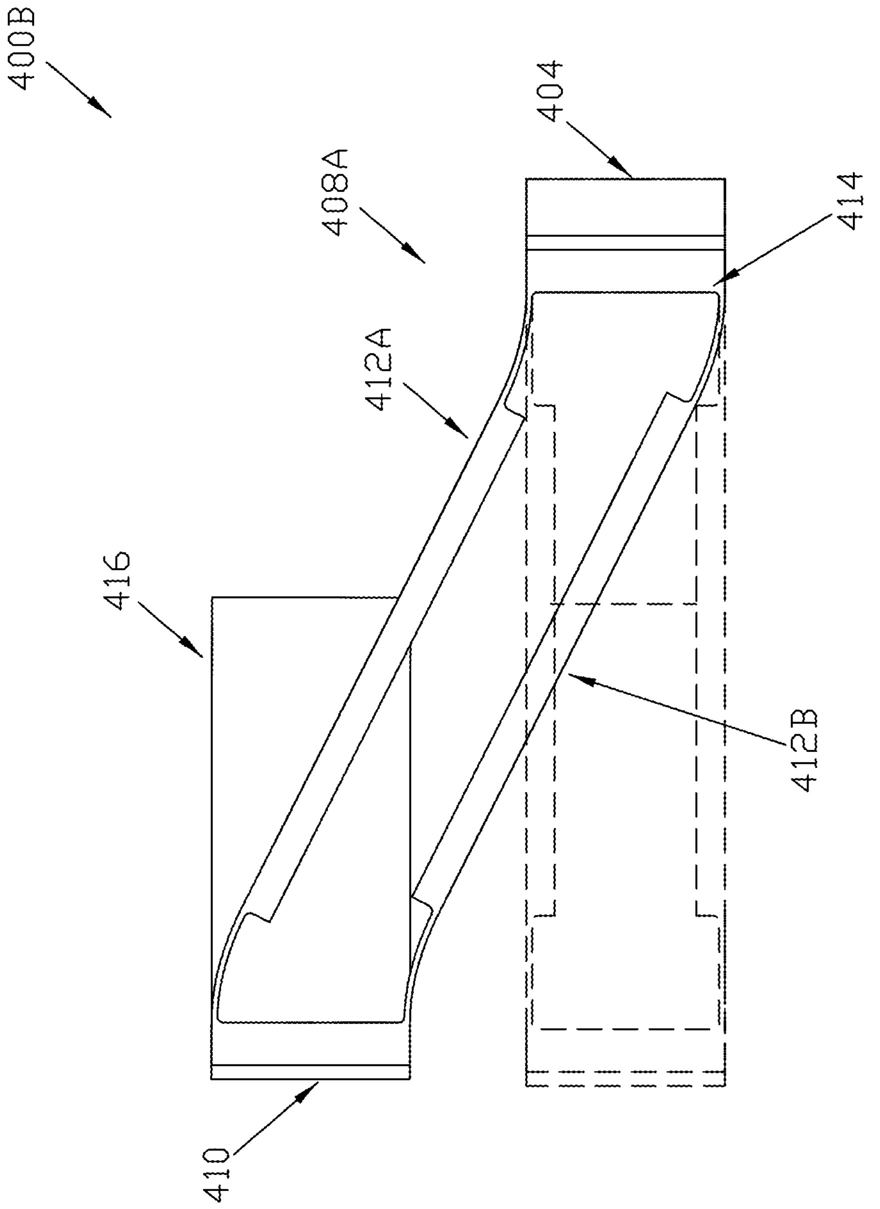

FIGS. 4A-4B illustrate views of a single parallelogram guiding spring actuator 400A-B. In FIG. 4A, a lens carriage 402 can be configured to obtain a lens and can act as a moving carriage as described herein. Further, actuators 408A-B can be configured to actuate and cause the lens carriage 402 to move. The actuator 400A can also include single parallelogram guiding spring structures 406A-B that are connected to both the lens carriage 402 and the static base 404.

FIG. 4B is a view 400B of the movement of the lens carriage 402 with a single parallelogram spring guiding structure 408A. As shown in FIG. 4B, in an actuated position, the moving carriage 416 can connect to a first end 410 of the structure 408A. Further, side lengths 412A-B can be configured to flex between the first end 410 and second end 414 connected to the static base 404.

In another example embodiment, an actuator can include a double parallelogram guiding spring actuator. The actuator can include double guiding spring structures in series on 3 sides of the actuator to constrain pitch, yaw and roll tilt. Further, two SMA Bimorph actuators can be configured to push carriage up and down.

Figure 5A:
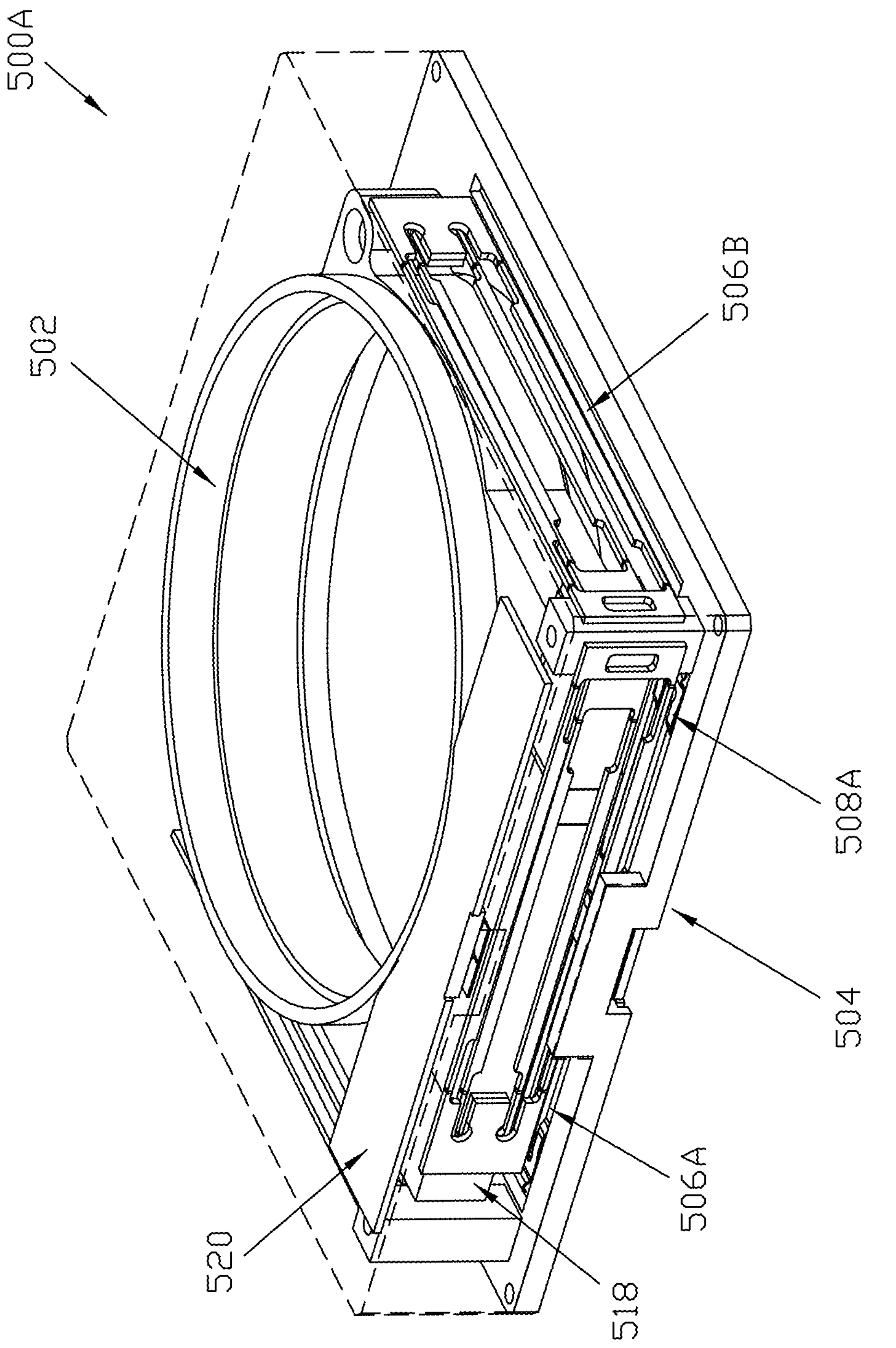
FIGS. 5A-5B illustrate views of a double parallelogram guiding spring actuator according to some embodiments.
Figure 5B:
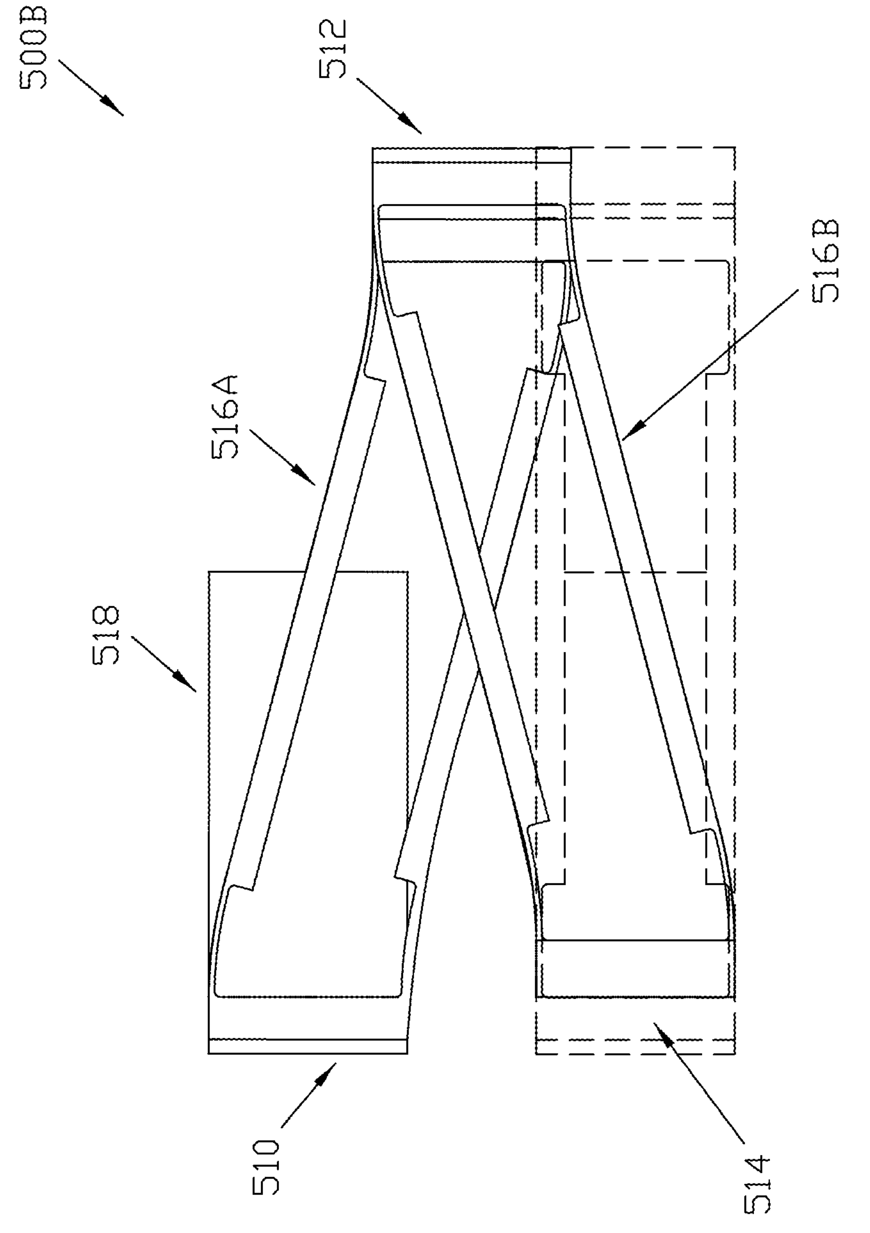

FIGS. 5A-5B illustrate views 500A-B of a double parallelogram guiding spring actuator. In FIG. 5A, multiple double parallelogram spring structures 506A-B can connect to both the lens carriage 502 and the static base 504. Further, actuators 508A-B can cause actuation of the lens carriage 502 as part of an autofocus system.

In FIG. 5B, the double parallelogram spring structure can include a first end 510 connected to the moving carriage 518, a second end 514, and a connector 512 connecting structures 516A-B. The connector 512 can connect the inner and outer parallelogram springs together.

In another embodiment, a stacked parallelogram guiding spring actuator can be provided. Stacked parallelogram guiding spring structures can double the stroke for a single lens (e.g., for a macro focus application). The structures can also provide independent actuation of two lenses (e.g., for a variable zoom lens application). Further, two SMA Bimorph actuators can each push the carriage up and down (4 total SMA Bimorph actuators).

Figure 6A:
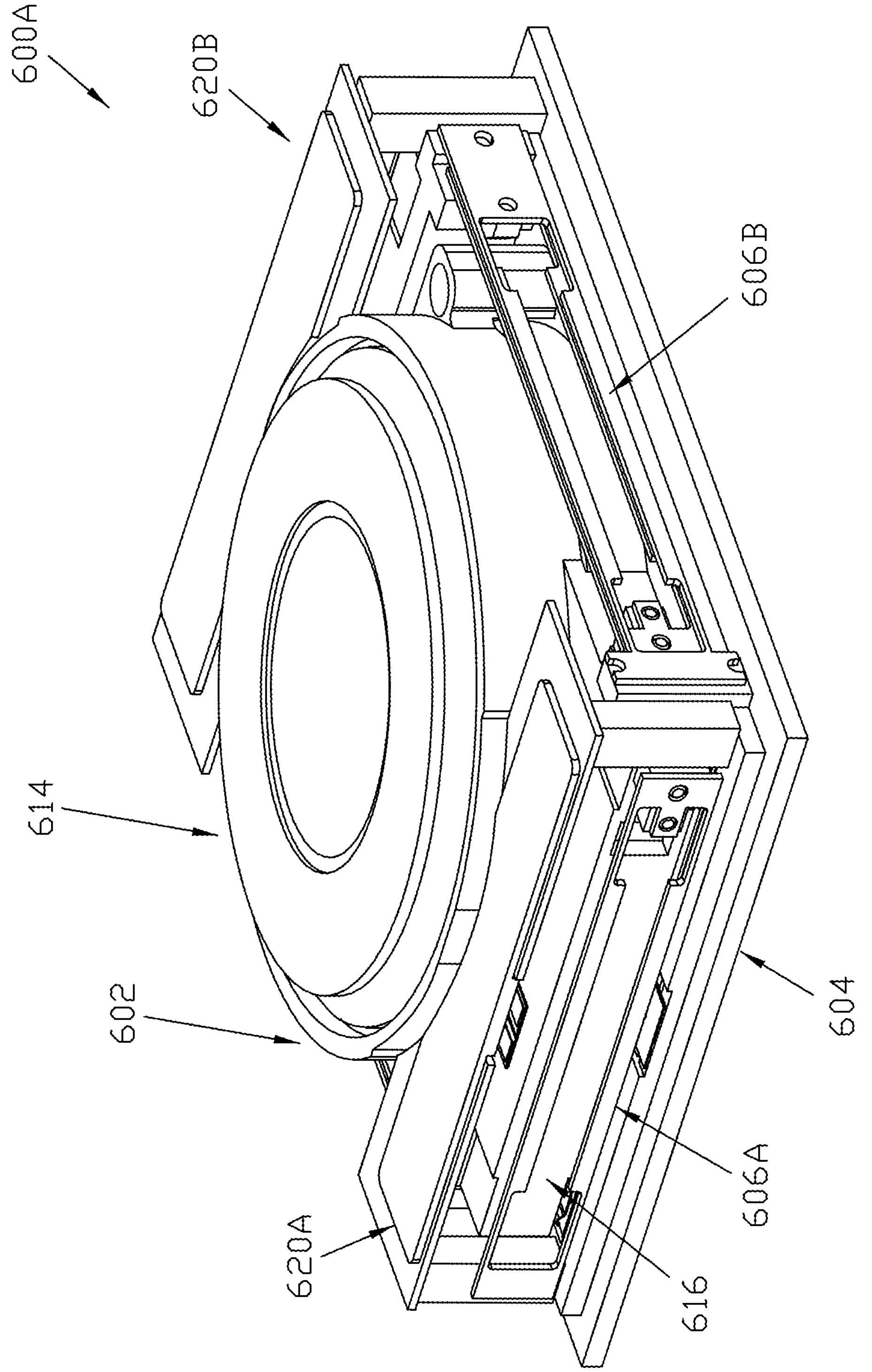
FIGS. 6A-6B illustrate an example stacked parallelogram guiding spring actuator according to some embodiments.
Figure 6B:
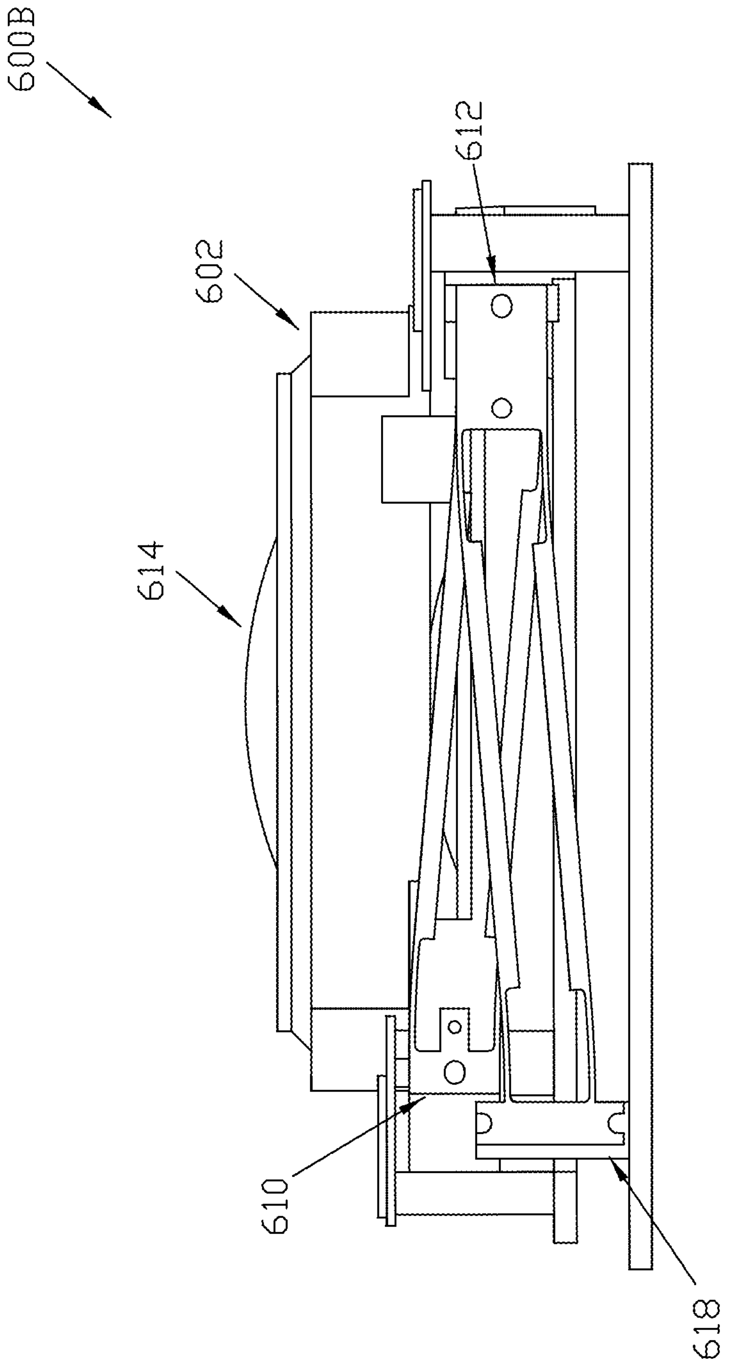

FIGS. 6A-6B illustrate an example stacked parallelogram guiding spring actuator 600A-B. As shown in FIG. 6A, a lens 614 can be disposed in lens carriage 602. Further, actuators 608A-B can be configured to actuate the lens carriage. The stacked parallelogram guiding spring structures 606A-B can be configured to mitigate unwanted motion of the moving carriage 616 as described herein. In FIG. 6B, a stacked parallelogram guiding spring structure can include an end 610 connected to the moving carriage, a connector 612 connecting parallelogram structures, and a second end 618 connected to the static base.

In another example embodiment, a single guiding spring SMA bimorph autofocus system is provided. Performance targets of the system can include a stroke of around 1 mm (plus/minus 0.5 mm) and a dynamic tilt of less than 0.1 degrees. The system can include two inline bimorph actuators assemblies (bimorph+carriage). Further, the actuators can push on lens carriage side where guiding springs are attached to minimize induced torque which minimizes any tilt. Further, three SST parallelogram guiding springs attach the moving lens carriage to the base, which can constrain tilt motion while moving in Z direction. The system can also include three additional plastic components including the base, housing, and lens carriage. The system can include a 12.8 mm lens dia. (1/1.3" sensor) in this example. The system can also include a height of around 3.6 mm, a length of around 16 mm, and a width of around 17 mm.

Figure 7A:
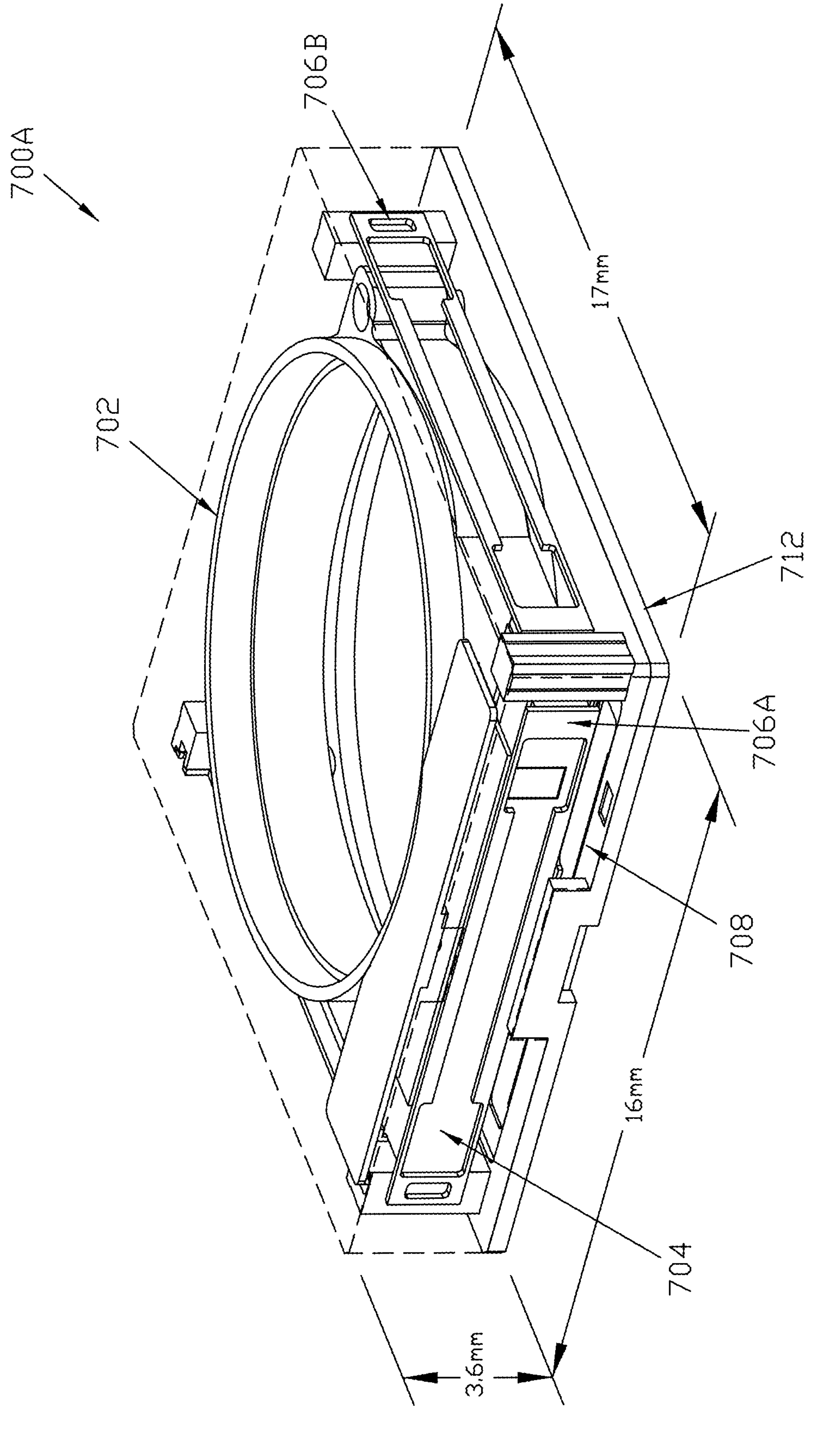
FIGS. 7A-7B illustrate views of an example single guiding spring SMA bimorph autofocus system according to some embodiments.
Figure 7B:
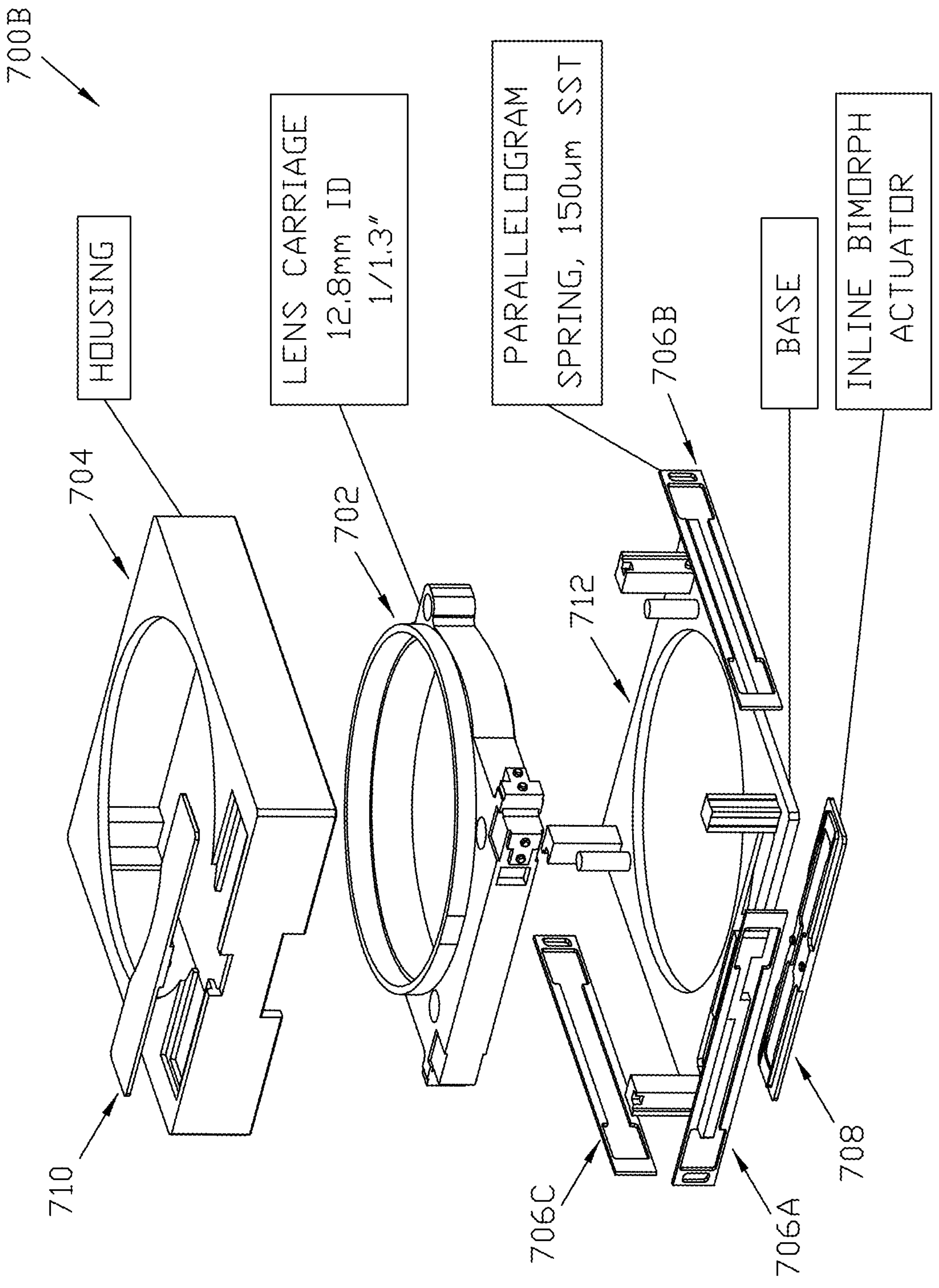

FIGS. 7A-7B illustrate views 700A-B of an example single guiding spring SMA bimorph autofocus system. As shown in FIG. 7A, the system can include a lens carriage 702, moving carriage 704, and static base 712. Further, the system can include at least one actuator subassembly 708 and single parallelogram guiding structures 706A-B.

FIG. 7B provides an exploded view 700B of the example single guiding spring SMA bimorph autofocus system. In FIG. 7B, the system can include a housing 704 with a bimorph actuator sub-assembly 710 disposed over the housing 704. In this embodiment, sub-assemblies 708, 710 can push in opposing directions. Further, the system can include a lens carriage 702. The lens carriage 702 can have a diameter of around 12.8 mm.

The system can also include a static base 712 and parallelogram spring structures 706A-B on each side of the static base. Further, an inline bimorph actuator 708 can be connected to the static base 712 so as to actuate the moving carriage and/or the lens carriage 702.

Figure 8A:
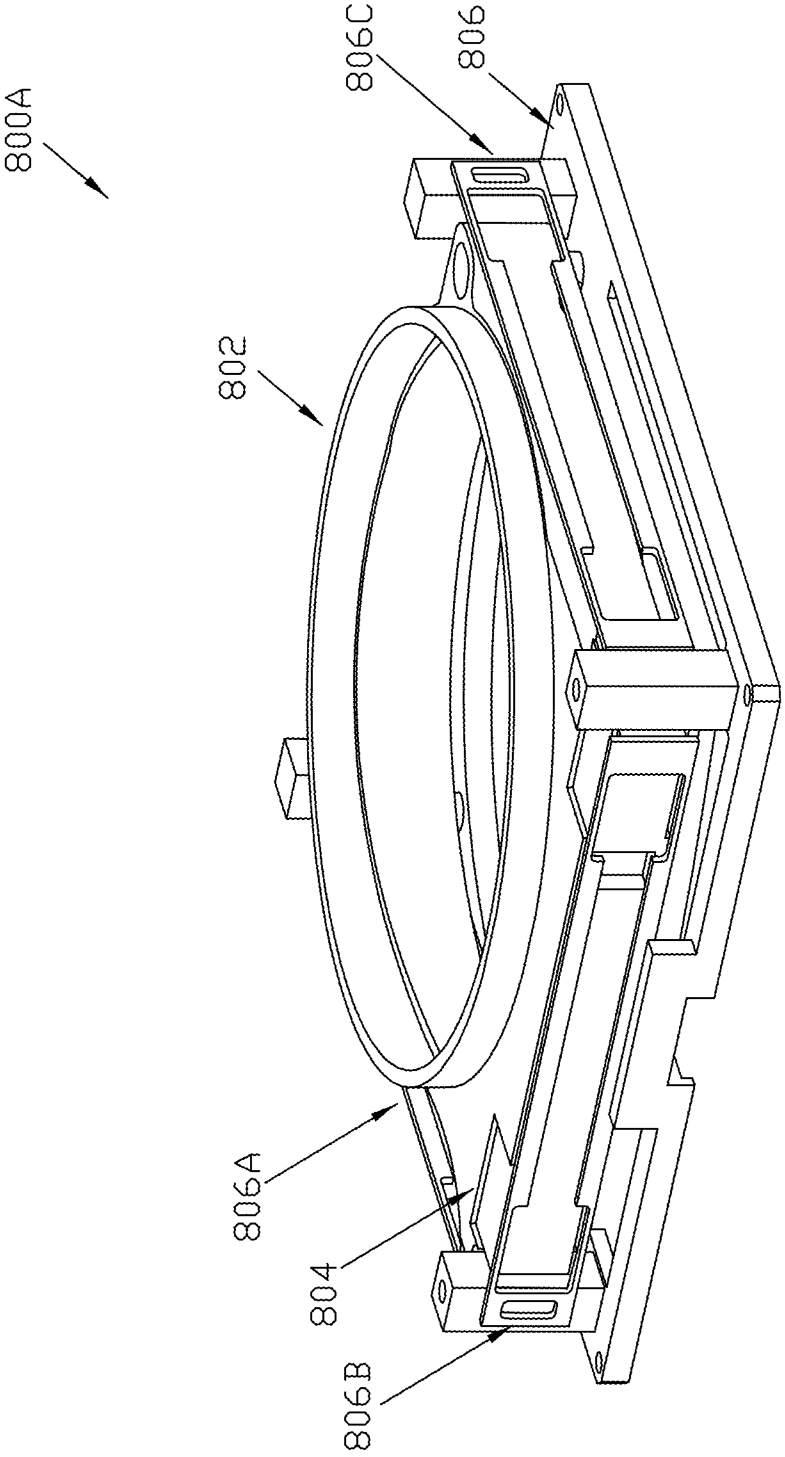
FIGS. 8A-8B illustrate an example single guiding spring SMA bimorph actuator in various actuation positions according to some embodiments.
Figure 8B:
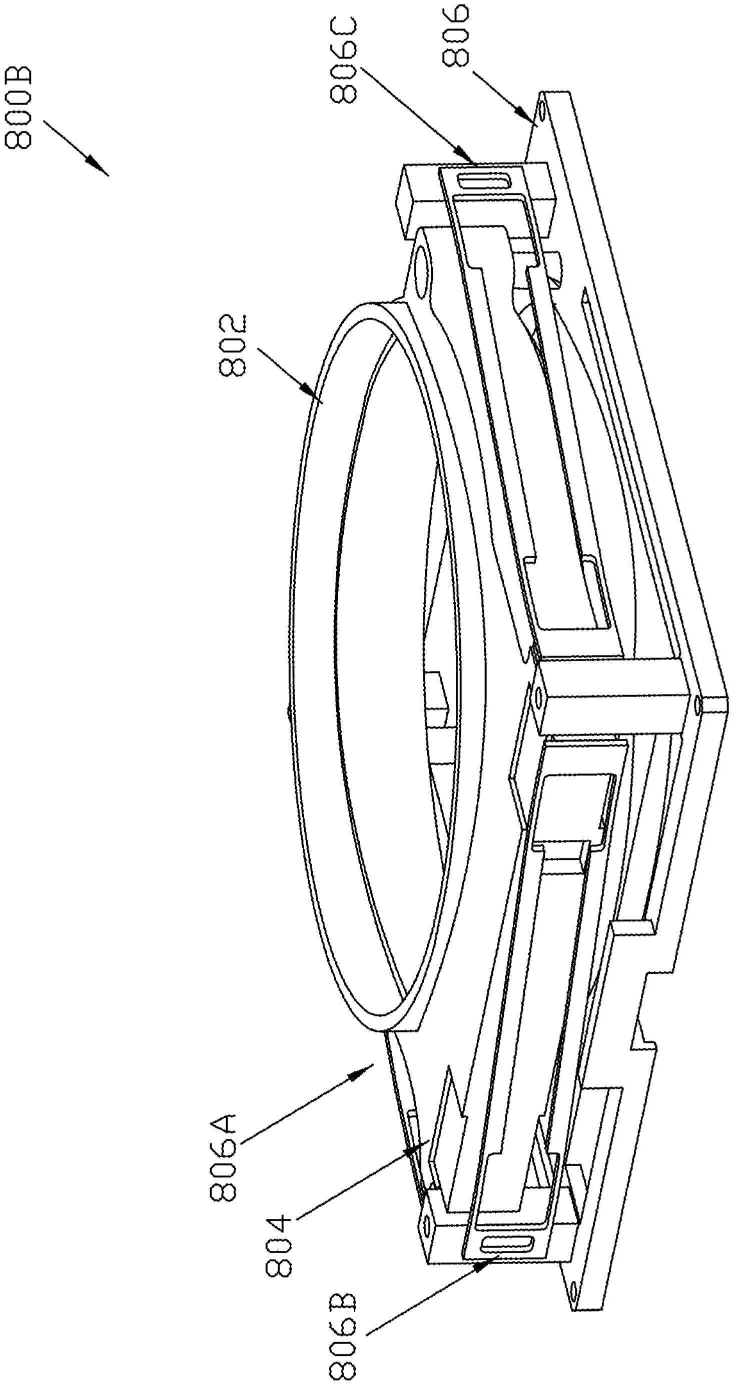

FIGS. 8A-8B illustrate an example single guiding spring SMA bimorph actuator 800A-B in various actuation positions. For instance, in FIG. 8A, the actuator 800A can be in an unactuated position. Further, in FIG. 8A, the actuator 800A can include a lens carriage 802, moving carriage, and three parallelogram spring structures 806A-C each on sides of the actuator and connected to a static base 806 and the moving carriage 804. FIG. 8B illustrates the actuator 800B in an actuated position. As shown in FIG. 8B, the moving carriage 804 can be actuated in the positive Z direction. The parallelogram spring structures 806A-C can mitigate unwanted movement of the moving carriage 804 during actuation by SMA actuators.

Figure 9A:
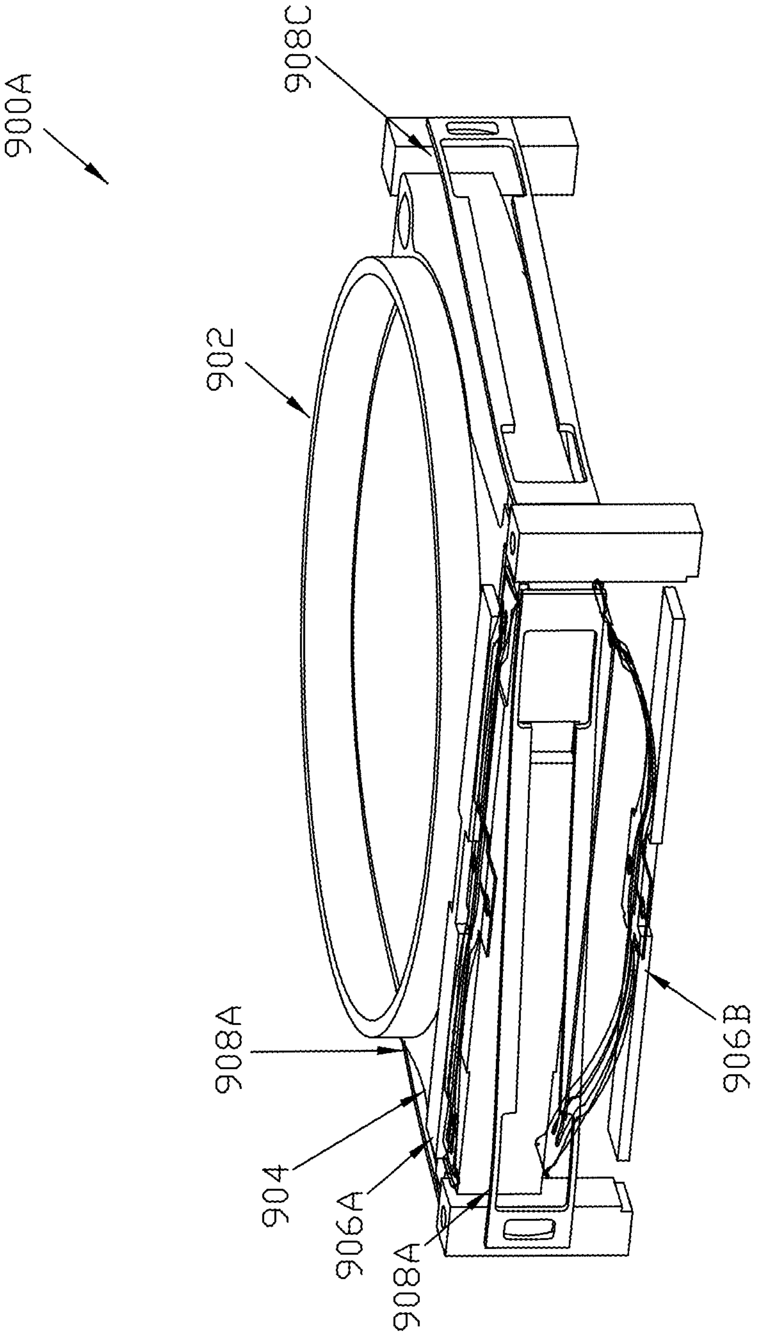
FIGS. 9A-9B illustrate actuation of a single guiding spring SMA bimorph actuator according to some embodiments.
Figure 9B:
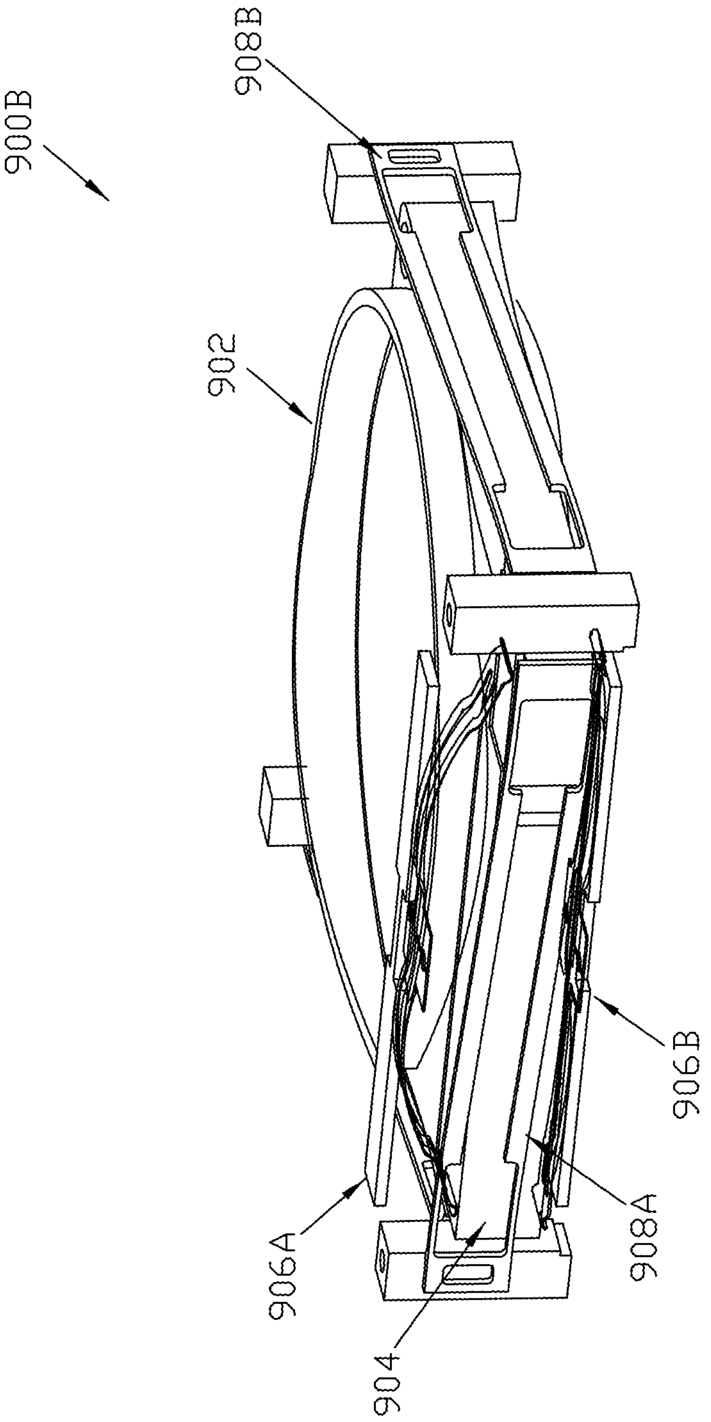

FIGS. 9A-9B illustrate actuation of a single guiding spring SMA bimorph actuator 900A-B. As shown in FIG. 9A, the actuator 900A can be in a first actuated position. Particularly, SMA bimorph actuators 906A-B can cause actuation of the moving carriage 904 and lens carriage 902. The parallelogram spring structures 908A-C can mitigate or prevent unwanted movement of the moving carriage 904. The actuator 900A-B include a maximum Z-stroke of around 1.05 mm and a maximum dynamic tilt of around 0.034° (<2').

FIG. 9B illustrates the actuator 900B in a second actuated position. Particularly, in FIG. 9B, the SMA bimorph actuator 906A can actuate to move the moving carriage 904 in a negative Z direction.

In some instances, a single guiding spring SMA bimorph autofocus system can have stroke deflection as the lens carriage is actuated. Bimorph actuators can be positioned to directly push moving carriage up and down. Further, three SST parallelogram guiding springs attach the moving lens carriage to the static base (which can be shown as vertical pillars). Guiding springs can flex to allow vertical motion, while a moving side of each spring remains parallel to the base side (providing no tilt of the moving carriage).

Figure 10:
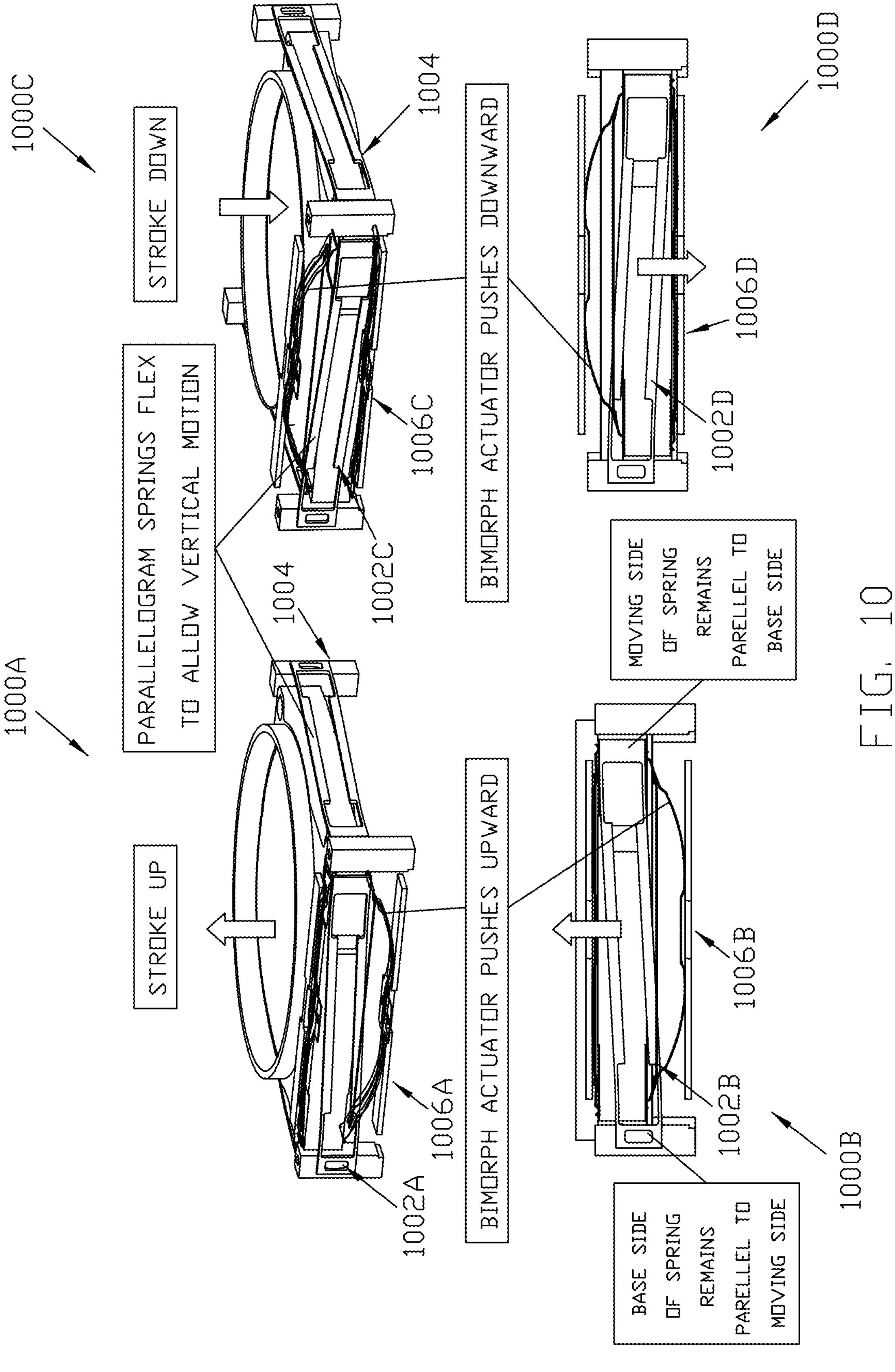
FIG. 10 illustrates a single guiding spring SMA bimorph autofocus system in both a stroke up and a stroke down position according to some embodiments.

FIG. 10 illustrates a single guiding spring SMA bimorph autofocus system in both a stroke up 1000A-B and a stroke down 1000C-D position. For instance, in a stroke up position 1000A, the parallelogram springs (e.g., 1002A-B, 1004) can flex to allow for vertical motion. Further, bimorph actuator 1006A-B can push upward, and a base side of the springs 1002A-B can remain parallel to the moving side. In the stroke down position 1000C-D, the springs 1002C-D can flex to allow for vertical motion and the bimorph actuator 1006C-D can push downward.

As noted above, the parallelogram spring structure can comprise a parallelogram shape or a similar shape (e.g., a substantially rectangular shape). The parallelogram spring structure can have equal opposite length sides with equal stiffness flexible hinge areas to ensure the moving end can remain parallel to the static end (no dynamic tilt). The lens carriage can be attached to the moving ends of each parallelogram spring structure. The parallelogram spring can include 150 um High Strength SST material and four bend areas etched to 100 um wide at 2 mm long. The parallelogram spring structure can have a dynamic tilt of around 0.03° (<2') and a total vertical stiffness (Vk) of around 143 N/m in each parallelogram spring structure. A maximum stress can be around 335 MPa (¼ yield strength) at a maximum Z stroke condition (±0.5 mm) with a X/Y Crosstalk with 1 mm Z-Stroke of around 12 um.

Figure 11A:
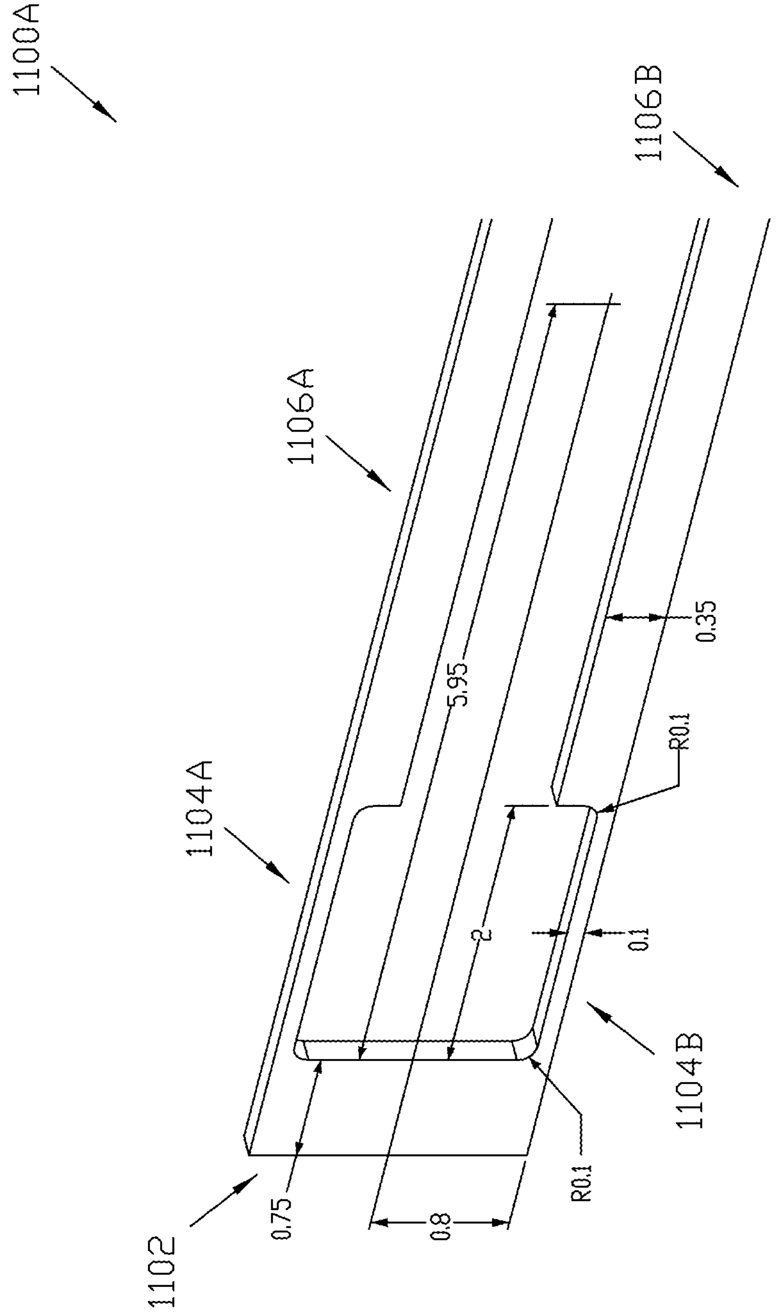
FIGS. 11A-11B illustrate views of an example parallelogram spring structure according to some embodiments.
Figure 11B:
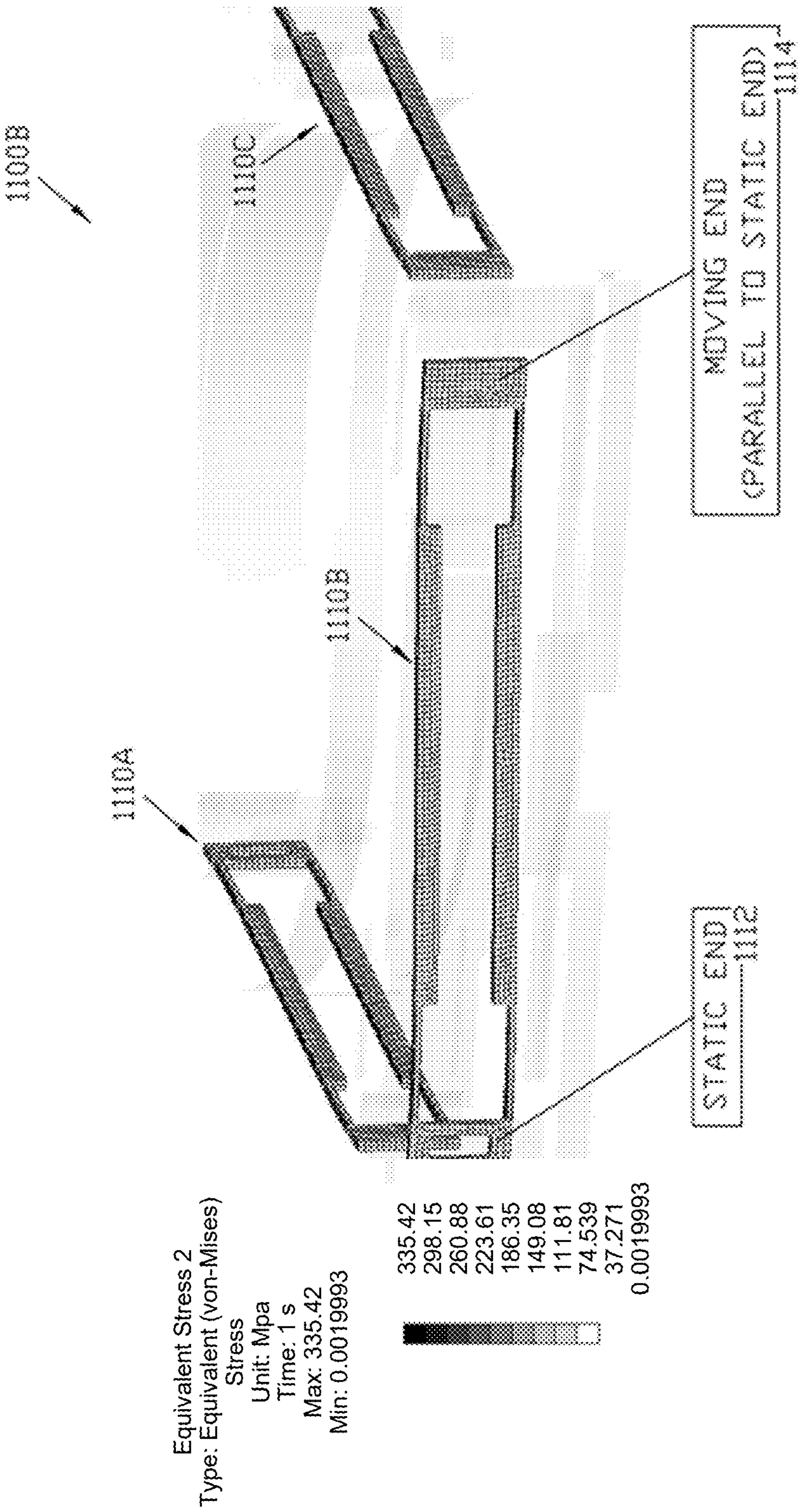

FIGS. 11A-11B illustrate views of an example parallelogram spring structure 1100A-B. As shown in FIG. 11A, the parallelogram spring structure 1100A can include a first end 1102 and side lengths 1106A-B connected to the end 1102 via hinge portions 1104A-B. The hinge portions 1104A-B can be flexible so as to allow the end 1102 to move with moving carriage during actuation as described herein. Further, FIG. 11B illustrates a view 1100B of multiple parallelogram spring structures 1110A-C with varying flexibility and equivalent stress. The hinge portions of each parallelogram spring structure 1110A-C can have an increased flexibility relative to side lengths or ends of each parallelogram spring structure.

In some instances, an autofocus system can include double guiding spring structures and SMA bimorph actuators. Such a system can have a stroke of around 1 mm and a dynamic tilt of around <0.1°. Such a design can include two inline bimorph actuator assemblies (bimorph+carriage) that can push on lens carriage side where guiding springs are attached to minimize induced torque which minimizes any tilt. Further, six SST parallelogram springs attach moving lens carriage to the base and can constrain tilt motion while moving in Z direction. Each side can have two parallelogram guiding springs attached in series. An inner spring can attach to outer spring on one end, with the other ends attaching to the base and moving lens carriage to guide motion. Three additional plastic components can include a base, housing, and lens carriage. The lens can have a 12.8 mm lens diameter (1/1.3" sensor) in this example.

Figure 12A:
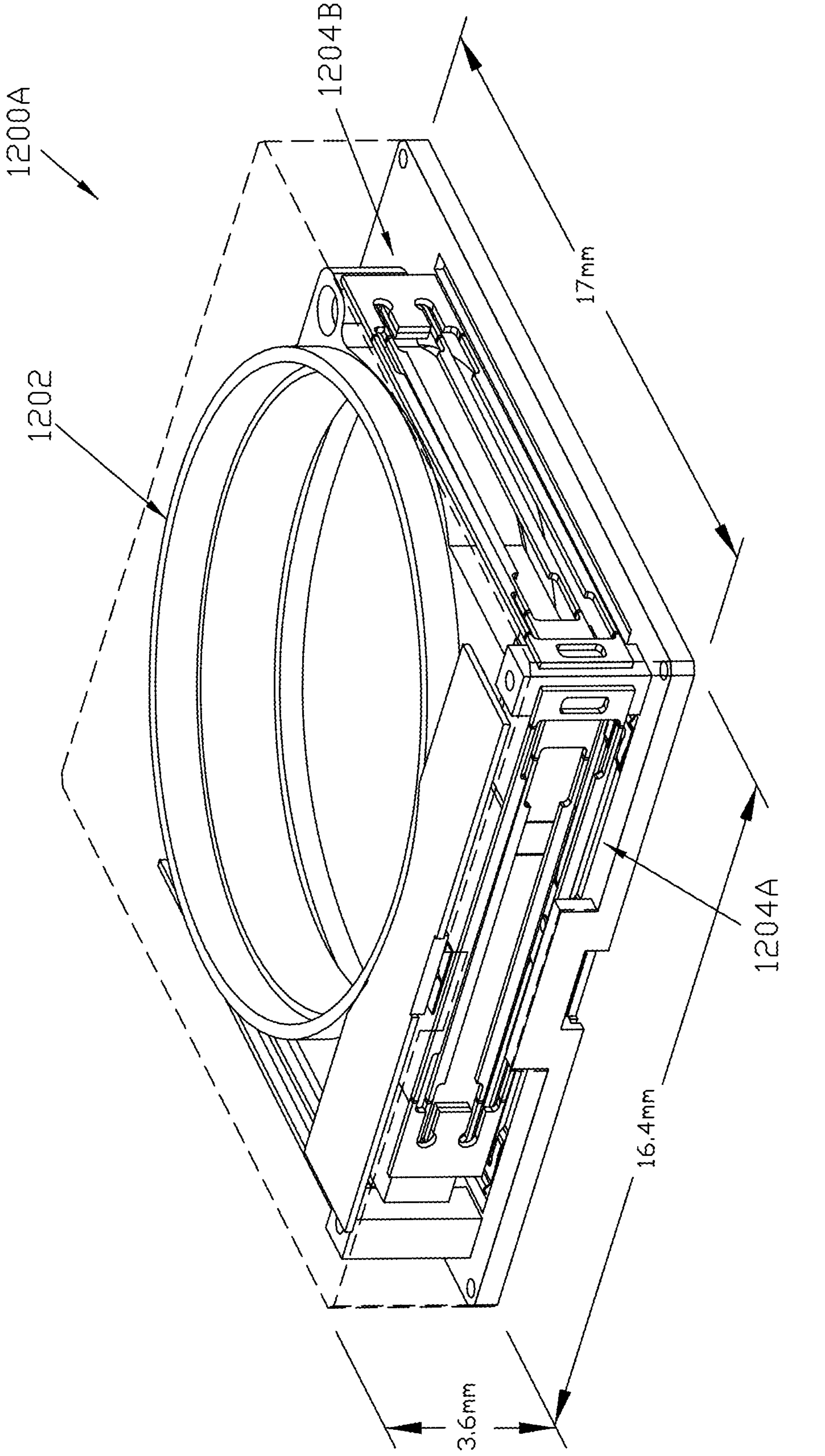
FIGS. 12A-B illustrate views of an example double guiding spring SMA bimorph autofocus system according to some embodiments.
Figure 12B:
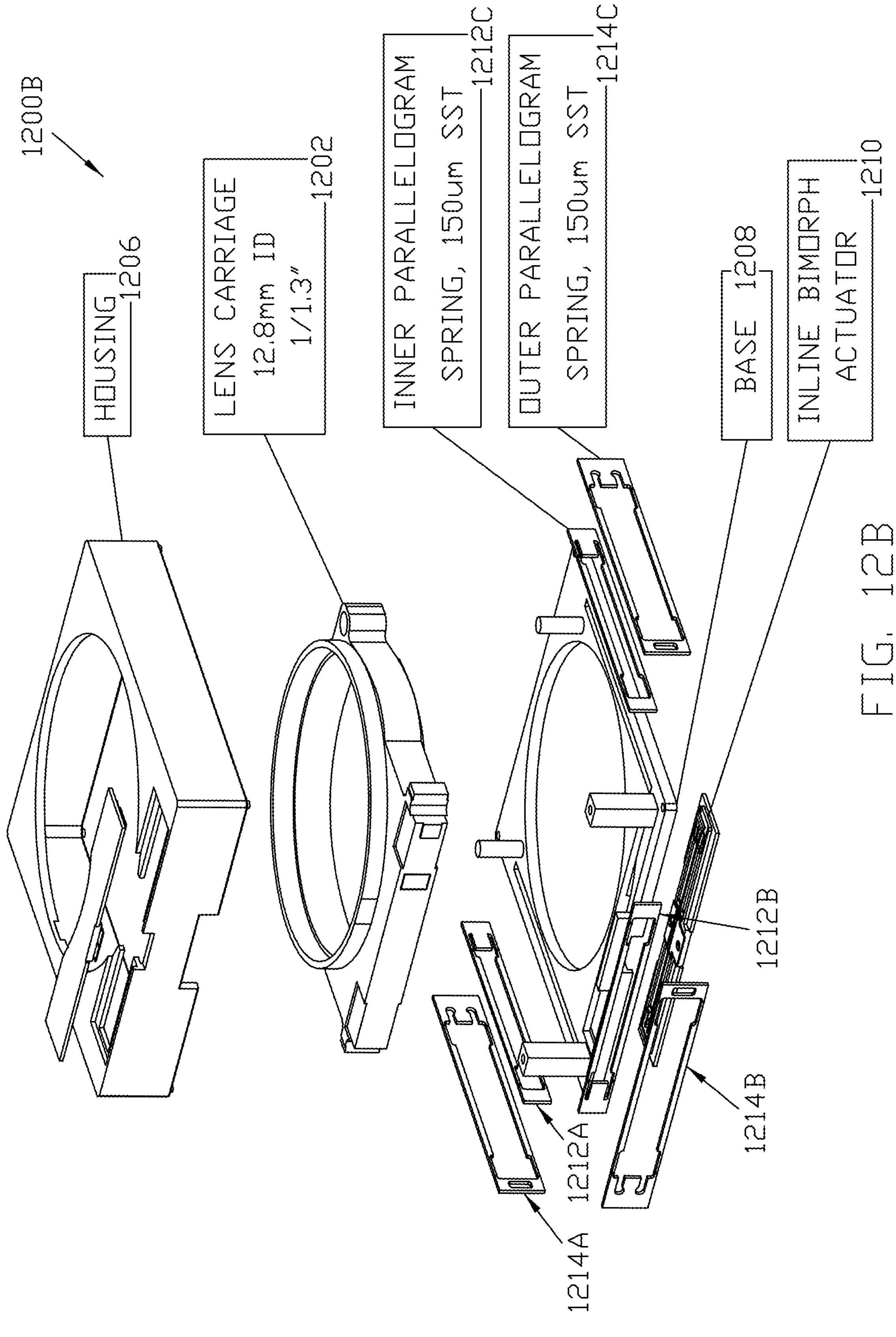

FIGS. 12A-B illustrate views of an example double guiding spring SMA bimorph autofocus system 1200A-B. In FIG. 12A, the system 1200A can include a lens carriage 1202 and double guiding spring structures 1204A-B. Further, as shown in FIG. 12B, the system 1200B can include a housing 1206 housing the lens carriage 1202. Further, a base 1208 can connect to multiple sets of double spring structures 1212A-C, 1214A-C with an example double spring structure including inner parallelogram spring 1212C and outer parallelogram spring 1214C, for example. Further, inline bimorph actuator 1210 can be connected to base 1208 and can move lens carriage 1202.

Figure 13A:
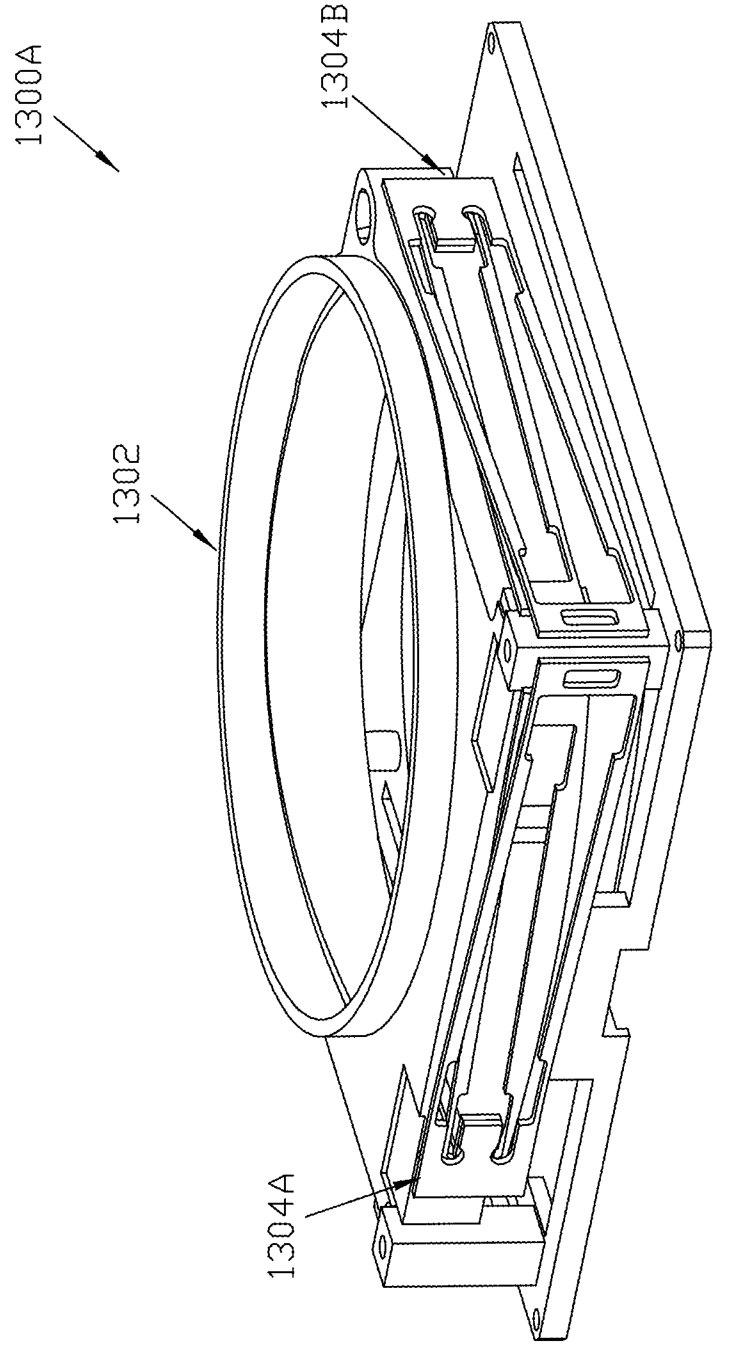
FIGS. 13A-B illustrate an example stroke of a double guiding spring bimorph autofocus system according to some embodiments.
Figure 13B:
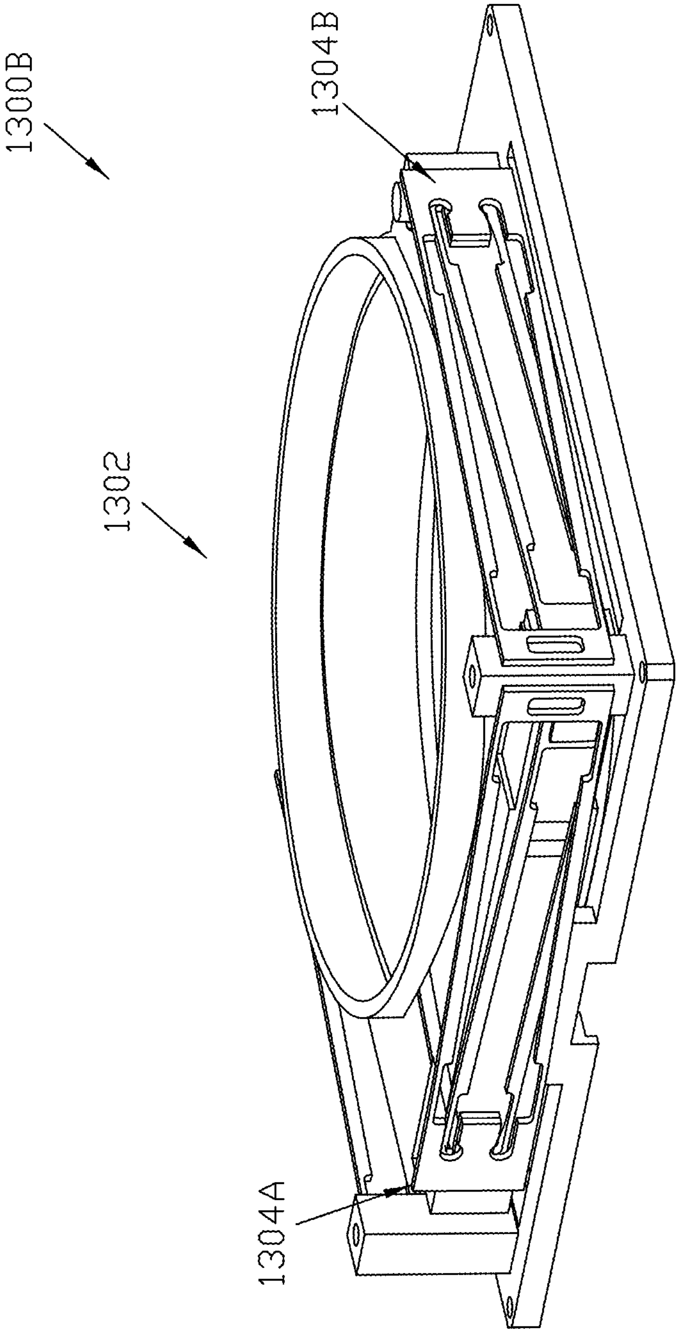

FIGS. 13A-B illustrate an example stroke of a double guiding spring bimorph autofocus system. For example, in an actuated position (e.g., 1300A in FIG. 13A) and an unactuated position (e.g., 1300B in FIG. 13B), the double guiding springs 1304A-B can move with lens carriage 1302 as the bimorph actuators move the lens carriage 1302.

Figure 14A:
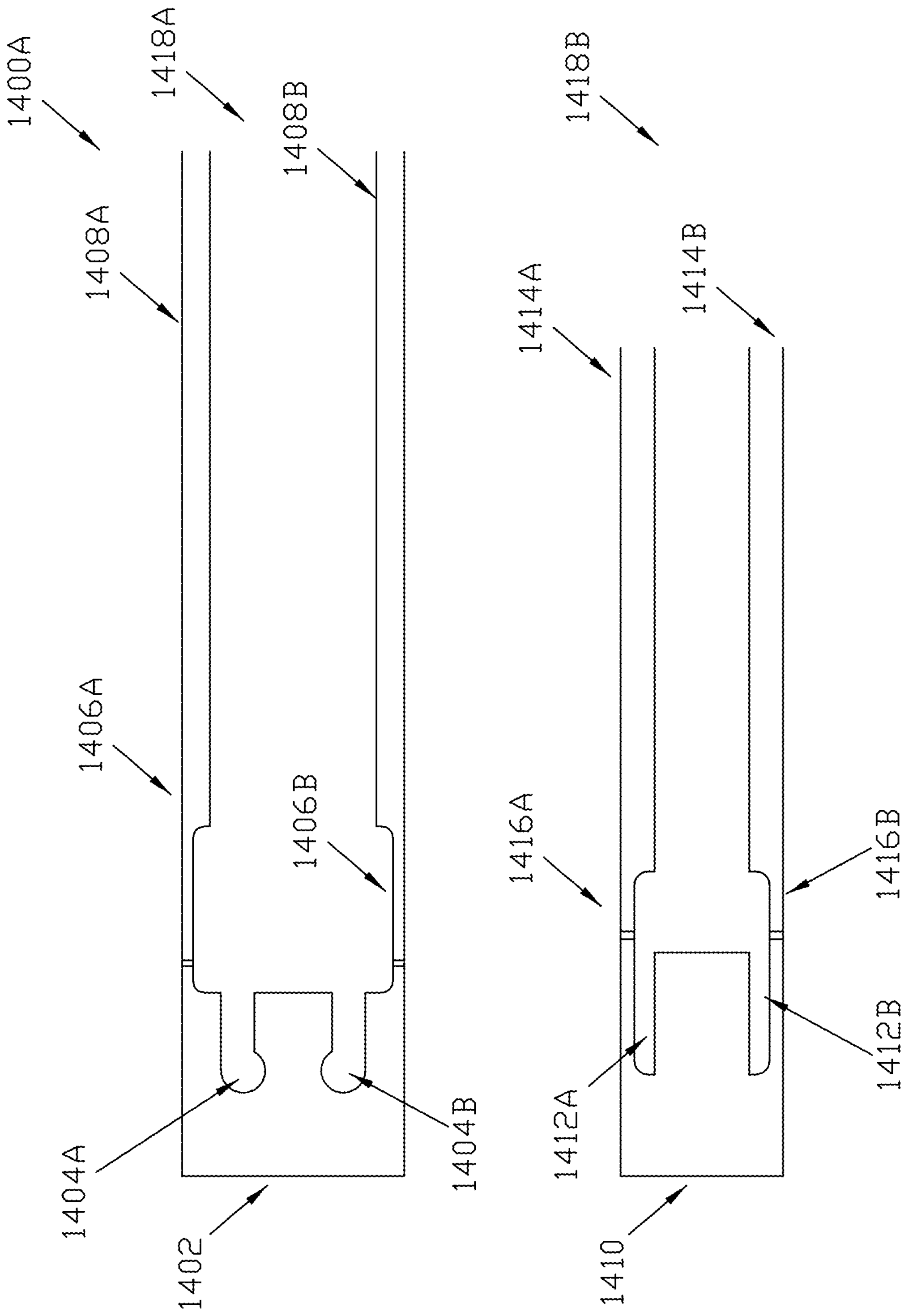
FIGS. 14A-B illustrates example views of double parallelogram spring structures according to some embodiments.
Figure 14B:
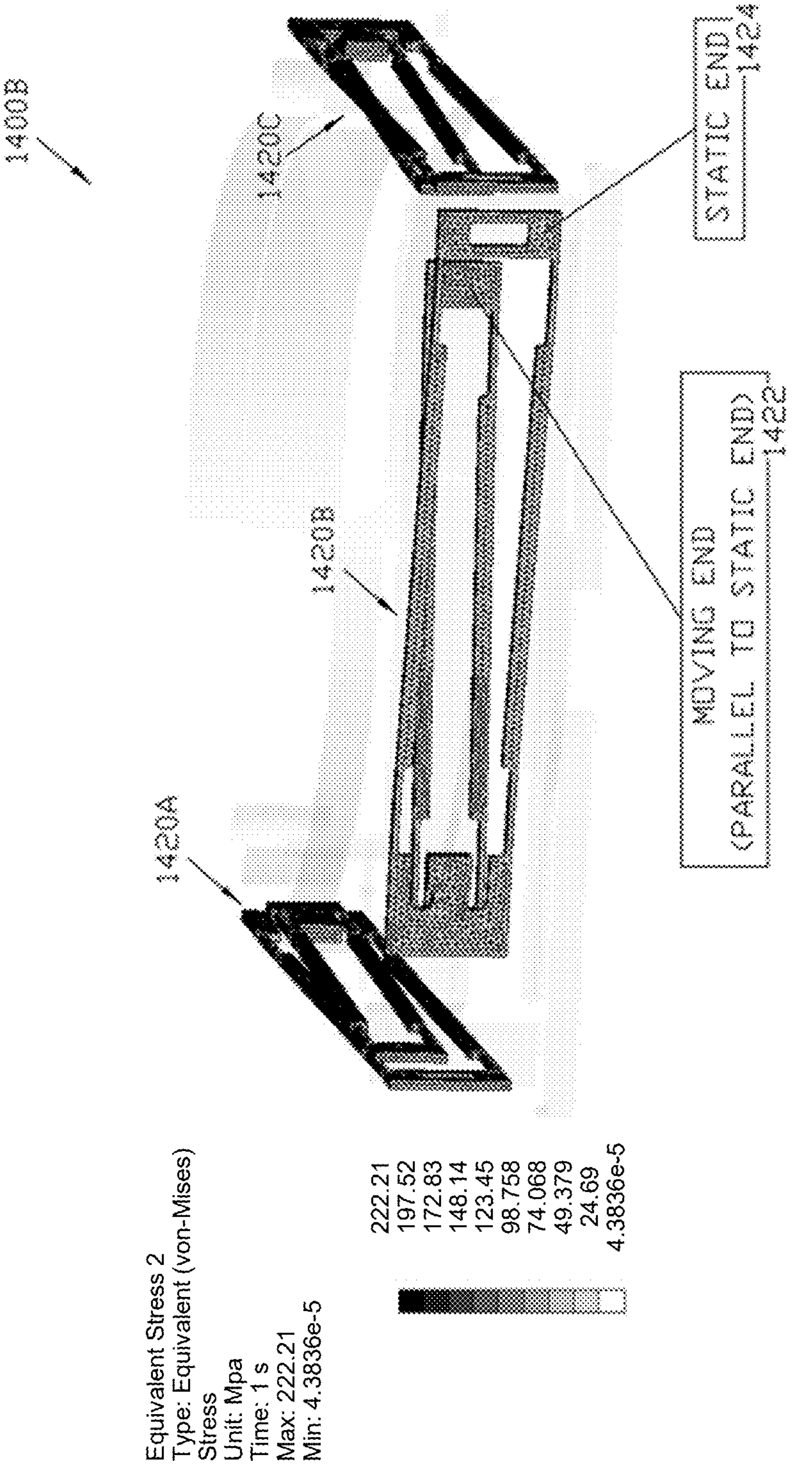

In some instances, parallelogram spring structures can have various design aspects. FIGS. 14A-B illustrate views 1400A-B of example parallelogram spring structures. Particularly, two parallelogram guiding springs weld to each other in the middle. Further, equal opposite length sides with equal stiffness flexible hinge areas ensure the moving end will remain parallel to the static end (no dynamic tilt). The lens carriage can be attached to the moving ends with around a 150 um High Strength SST material. Four bend areas can be etched to 100 um wide @ 1.5 mm long (each spring).

The parallelogram spring structures can have a dynamic tilt of around 0.05° (3') and a total vertical stiffness (Vk) of around 127 N/m for all three parallelogram springs. A maximum stress can be around 222 MPa (⅕ yield strength) at a maximum Z stroke condition (±0.5 mm) with a X/Y Crosstalk with 1 mm Z-Stroke of around 0.24 um.

In FIG. 14A, a double parallelogram spring structure 1400A can include an outer parallelogram spring 1418A and an inner parallelogram spring 1418B. Outer parallelogram spring 1418A can include an end 1402 with inlets 1404-B formed in end 1402. Side lengths 1408A-B can connect to the end 1402 via flexible hinge portions 1406A-B. Inner parallelogram spring 1418B can include end 1410 with inlets 1412A-B into end 1410. Further, spring 1418B can include side lengths 1414A-B and flexible hinge portion 1416A-B. FIG. 14B illustrates a view 1400B of multiple double parallelogram spring structures 1420A-C. Each structure can include a moving end 1422 parallel to the static end 1424.

In some instances, a stacked guiding spring bimorph actuator is described. This actuator can include high stroke and two payloads (e.g., lenses). An upper lens stroke can be around 2 mm and a lower lens stroke can be around 1 mm. Further, two parallelogram guided spring actuators can be built stacked on top of each other. The parallelogram spring structures can be single or double parallelogram guiding spring structures as described herein.

Lower parallelogram springs can be attached between static base and lower carriage. Lower bimorphs push upper and lower carriages/lens and upper bimorphs up and down. Upper bimorphs can be attached to lower carriage. Upper bimorphs can push the upper carriage/lens up and down further.

Figure 15A:
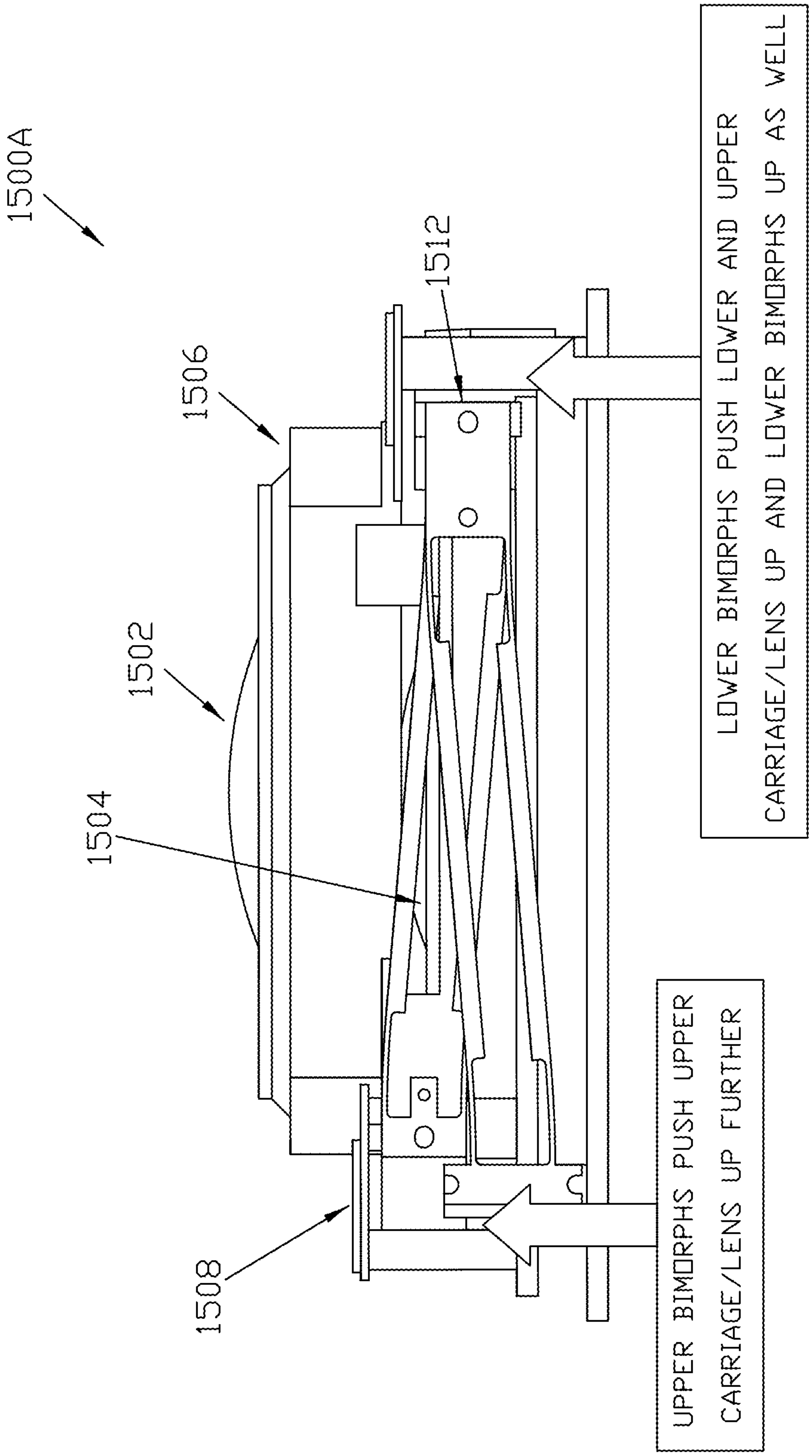
FIGS. 15A-B illustrate views of an example stacked guiding spring bimorph actuator according to some embodiments.
Figure 15B:
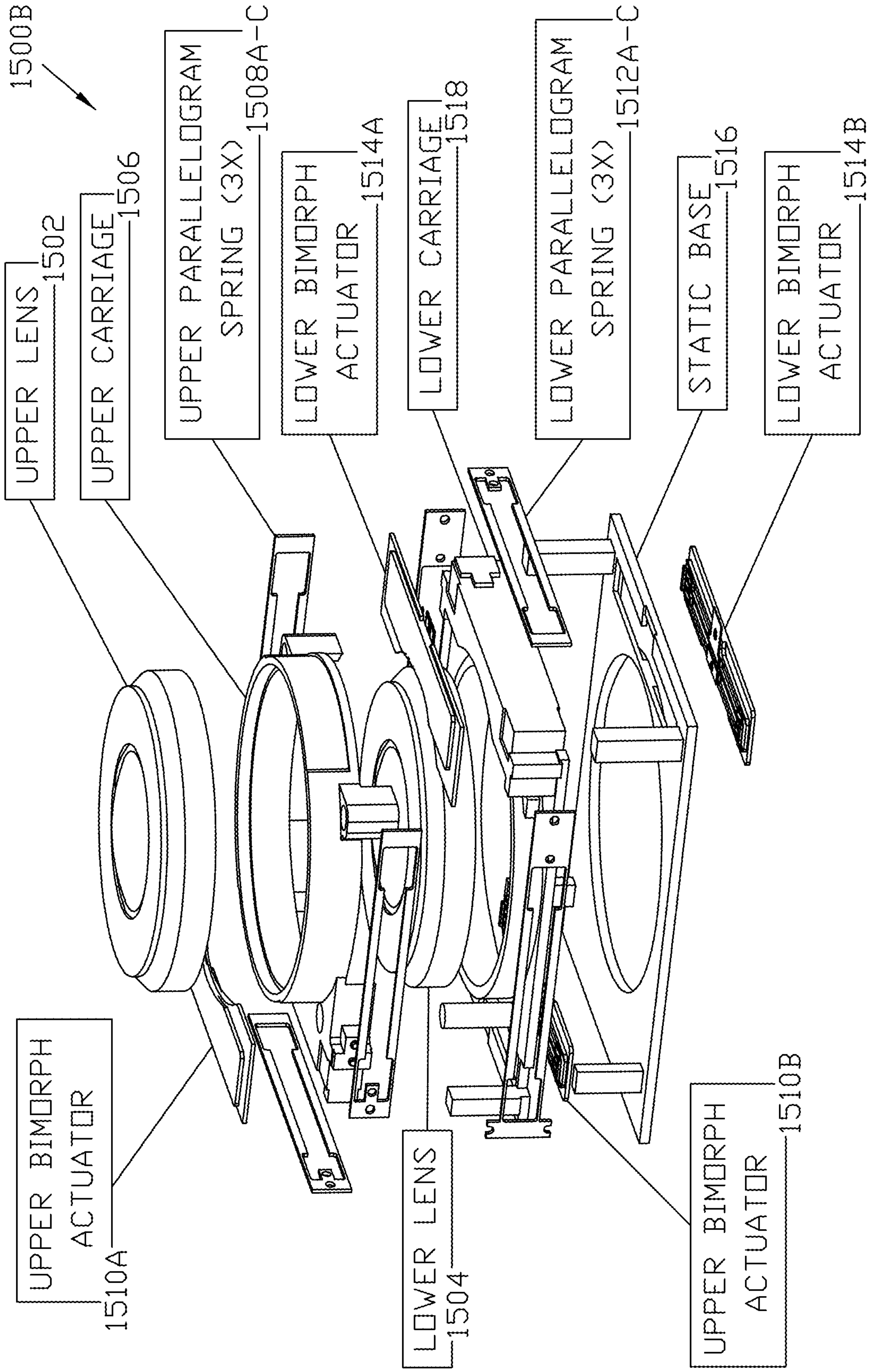

FIGS. 15A-B illustrate views 1500A-B of an example stacked guiding spring bimorph actuator. For instance, as shown in FIG. 15A, the actuator 1500A can include upper lens 1502 and lower lens 1504. Upper lens 1502 can be in lens carriage 1506. Further, an upper parallelogram spring 1508 and lower parallelogram spring can constrict unwanted movement of the lens carriage 1506.

FIG. 15B is an exploded view 1500B of the example stacked guiding spring bimorph actuator. The actuator can include an upper lens 1502 in upper lens carriage 1506. Further, lower lens 1504 can be in lower carriage 1518 connected to static base 1516. Upper parallelogram springs 1508A-C can connect to carriage 1506, and bimorph actuators 1510A, 1514A can actuate carriage 1506. Further, lower parallelogram springs 1215A-C and bimorph actuators 1510B, 1514B can actuate the lower carriage 1518.

Figure 16:
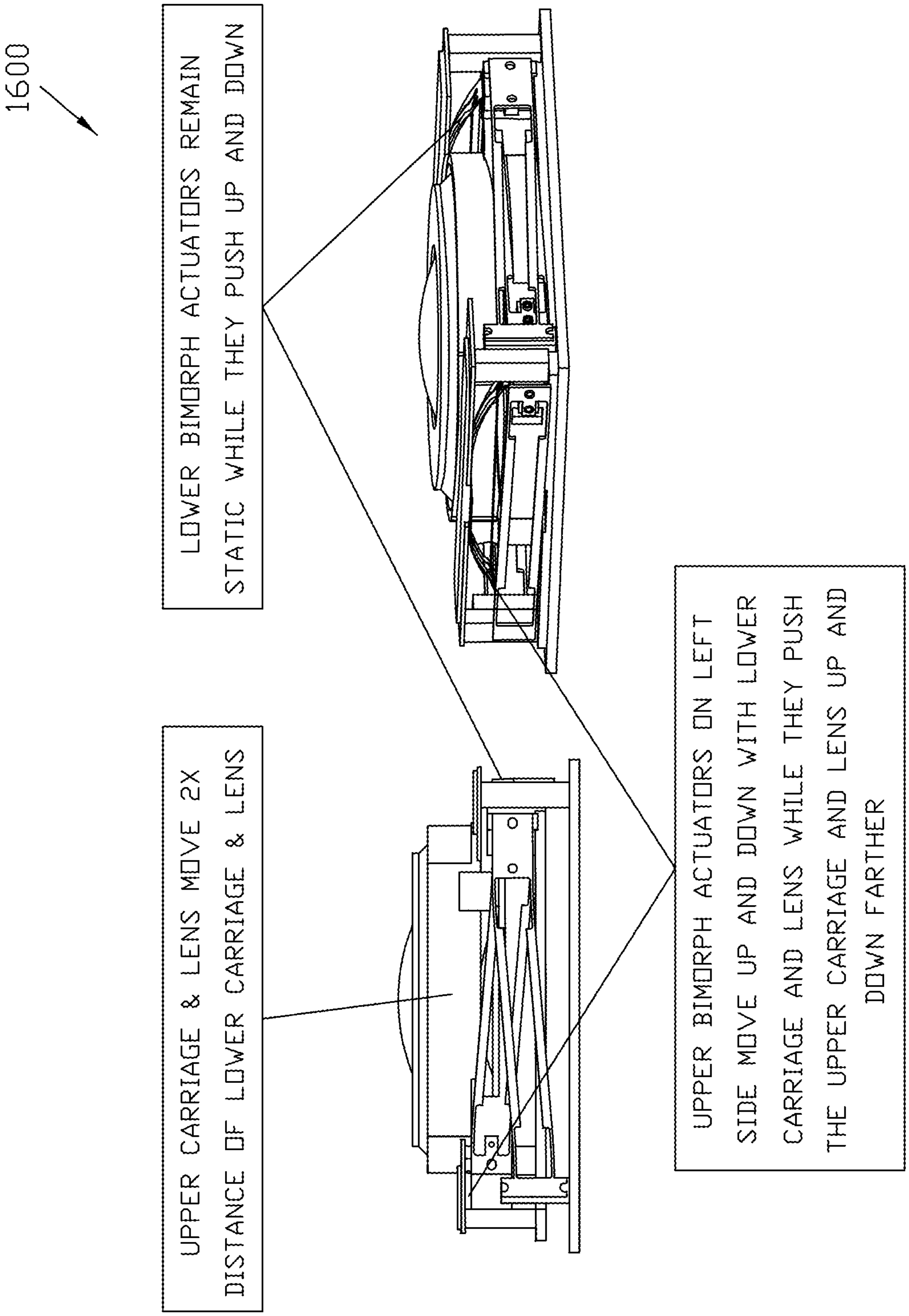
FIG. 16 is an example of a stacked guiding spring bimorph actuator in different actuation positions according to some embodiments.

FIG. 16 is an example of a stacked guiding spring bimorph actuator 1600 in different actuation positions. For example, an upper carriage and lens can move twice the distance of the lower carriage and lens during actuation. The upper bimorph actuators on the left side can move up and down with the lower lens carriage and lower lens as they push the upper carriage and upper lens up and down with a greater stroke distance. Lower bimorph actuators can remain static while upper bimorph actuators push up and down.

In a first example embodiment, a system is provided. The system can include a bimorph actuator a moving carriage configured to move in response to actuation by the bimorph actuator. The system can also include a base configured to remain static.

The system can also include a first parallelogram guiding structure. The first parallelogram guiding structure can include a first end connected to the moving carriage and a second end connected to the static base. The first parallelogram guiding structure can also include a set of side lengths connecting the first end to the second end. The first parallelogram guiding structure can be configured to flex with the moving carriage such that an orientation of the first end remains substantially in parallel with an orientation of the second end.

In some instances, the first parallelogram guiding structure further comprises a set of flexible hinge areas formed between the set of side lengths and each of the first end and second end. The flexible hinge areas can be configured to flex as the moving carriage is actuated.

In some instances, the set of flexible hinge areas include a width less than a width of the set of side lengths.

In some instances, the first parallelogram guiding structure is disposed at a first side of the moving carriage and the static base, and wherein a second parallelogram guiding structure is disposed at a second side of the moving carriage and the static base.

In some instances, the first parallelogram guiding structure comprises an outer parallelogram guiding structure. The system can further comprise an inner parallelogram guiding structure. The inner parallelogram guiding structure can include a first end connected to the outer parallelogram guiding structure at the second end of the outer parallelogram guiding structure and a second end connected to a static endpoint. The inner parallelogram guiding structure can also include a set of side lengths disposed between the first end and the second end. The outer parallelogram guiding structure and the inner parallelogram guiding structure together can provide multiple motion arcs as the moving carriage actuates.

In some instances, the moving carriage comprises a lens carriage configured to receive a lens as part of an autofocus system.

In some instances, the bimorph actuator comprises a beam including a first end fixed to the static base and a second end comprising a free end and connected to the moving carriage and a shape metal alloy (SMA) material disposed along the beam between the fixed end and the free end.

In some instances, the device comprises three parallelogram spring structures each disposed on different sides of the moving carriage.

In some instances, a set of inlets are formed into each of the first end and the second end of the first parallelogram guiding structure.

In some instances, the system can include the moving carriage comprising an upper lens carriage configured to hold a first lens. The bimorph actuator can be connected to the upper lens carriage. The system can also include a lower lens carriage configured to hold a second lens. A second bimorph actuator can be connected to the lower lens carriage. A stroke distance of the upper lens carriage can be greater than a stroke distance of the lower lens carriage.

In another example embodiment, a parallelogram guiding structure for an actuator is provided. The parallelogram guiding structure can include a first end configured to connect to a moving carriage and a second end configured to connect to a static base. The parallelogram guiding structure can also include a set of side lengths including first side length and a second side length that each extend between the first end to the second end. The parallelogram guiding structure can also include a set of flex hinge areas formed between each of the set of side lengths and the first end and the second end. The set of flex hinge areas can be configured to flex as the first end moves with the moving carriage such that an orientation of the first end remains substantially in parallel with an orientation of the second end.

In some instances, the set of flexible hinge areas include a width less than a width of the set of side lengths.

In some instances, the first parallelogram guiding structure comprises an outer parallelogram guiding structure. The first parallelogram guiding structure further comprises an inner parallelogram guiding structure. The inner parallelogram guiding structure can include a first end connected to the outer parallelogram guiding structure at the second end of the outer parallelogram guiding structure. The inner parallelogram guiding structure can also include a second end connected to a static endpoint. The inner parallelogram guiding structure can also include a set of side lengths disposed between the first end and the second end. The outer parallelogram guiding structure and the inner parallelogram guiding structure together provide multiple motion arcs as the moving carriage actuates.

In some instances, a set of inlets are formed into each of the first end and the second end of the first parallelogram guiding structure.

In another example embodiment, a device provided. The device can include a moving carriage configured to move in response to actuation by an actuator and a base configured to remain static. The device can also include an outer parallelogram guiding structure comprising a first end connected to the moving carriage and a second end connected to the static base. The outer parallelogram guiding structure can also include a set of side lengths connecting the first end to the second end.

The device can also include an inner parallelogram guiding structure. The inner parallelogram guiding structure can include a first end connected to the outer parallelogram guiding structure at the second end of the outer parallelogram guiding structure and a second end connected to a static endpoint. The inner parallelogram guiding structure can also include a set of side lengths disposed between the first end and the second end.

In some instances, the inner parallelogram guiding structure and the outer parallelogram guiding structure further comprise a set of flexible hinge areas formed between the set of side lengths and each of the first end and second end of each of the inner parallelogram guiding structure and the outer parallelogram guiding structure. The flexible hinge areas can be configured to flex as the moving carriage is actuated.

In some instances, the set of flexible hinge areas include a width less than a width of the set of side lengths.

In some instances, a first set of the inner parallelogram guiding structure and the outer parallelogram guiding structure is disposed at a first side of the moving carriage and the static base. Further, a second set of the inner parallelogram guiding structure and the outer parallelogram guiding structure is disposed at a second side of the moving carriage and the static base.

In some instances, the moving carriage comprises a lens carriage configured to receive a lens as part of an autofocus system.

In some instances, a set of inlets are formed into each of the first end and the second end of each of the inner parallelogram guiding structure and the outer parallelogram guiding structure.

Figure 17A:
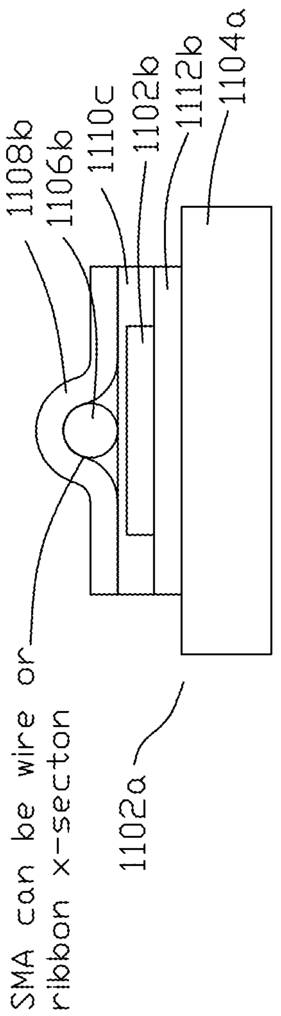
FIGS. 17A-C illustrates views of prior art bimorph actuators according to some embodiments.
Figure 17B:
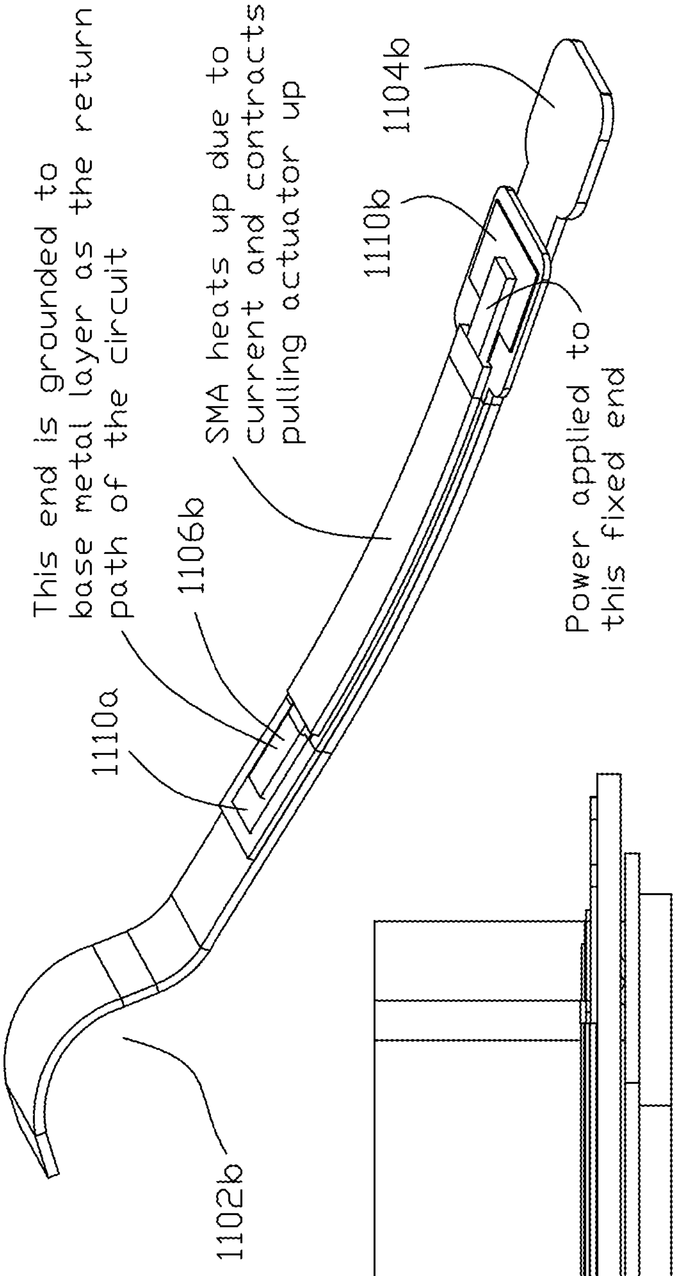
FIG. 17B PRIOR ART
Figure 17C:
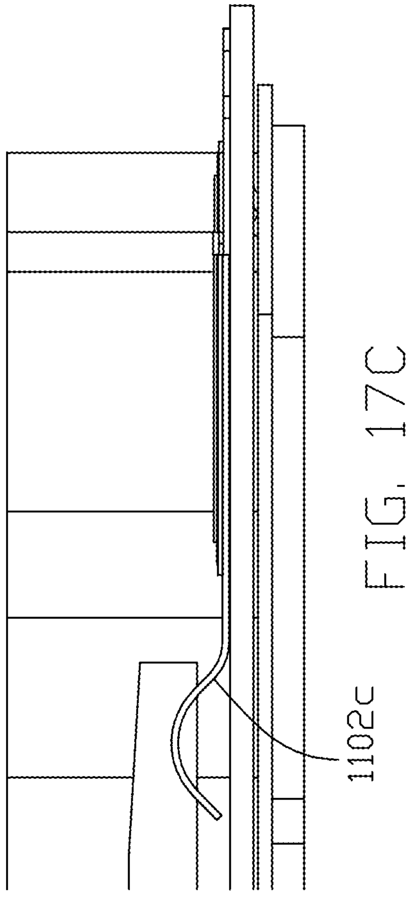

As noted above, a bimorph actuator can be used to actuate a moving carriage or lens carriage as described herein. FIGS. 17*a-c* illustrates views of prior art bimorph actuators according to some embodiments. According to various embodiments, a bimorph actuator 1702 includes a beam 1704 and one or more SMA materials 1706 such as an SMA ribbon 1706*b* (e.g., as illustrated in a perspective view of a bimorph actuator including an SMA ribbon according to the embodiment of FIG. 17*b*) or SMA wire 1706*a* (e.g., as illustrated in a cross-section of a bimorph actuator including an SMA wire according to the embodiment of FIG. 17*a*). The SMA material 1706 is affixed to the beam 1704 using techniques including those describe herein. According to some embodiments, the SMA material 1706 is affixed to a beam 1704 using adhesive film material 1708. Ends of the SMA material 1706, for various embodiments, are electrically and mechanically coupled with contacts 1710 configured to supply current to the SMA material 1706 using techniques including those known in the art. The contacts 1710 (e.g., as illustrated in FIGS. 17*a* and 17*b*), according to various embodiments, are gold plated copper pads.

According to embodiments, a bimorph actuator 1702 having a length of approximately 1 millimeter are configured to generate a large stroke and push forces of 50 millinewtons ("mN") is used as part of a lens assembly, for example as illustrated in FIG. 17*c*. According to some embodiments, the use of a bimorph actuator 1702 having a length greater than 1 millimeter will generate more stroke but less force that that having a length of 1 millimeter. For an embodiment, a bimorph actuator 1702 includes a 20 micrometer thick SMA material 1706, a 20 micrometer thick insulator 1712, such as a polyimide insulator, and a 30 micrometer thick stainless steel beam 1704 or base metal. Various embodiments include a second insulator 1714 disposed between a contact layer including the contacts 1710 and the SMA material 1706. The second insulator 1714 is configured, according to some embodiments, to insulate the SMA material 1706 from portions of the contact layer not used as the contacts 1710. For some embodiments, the second insulator 1714 is a covercoat layer, such a polyimide insulator. One skilled in the art would understand that other dimensions and materials could be used to meet desired design characteristics.

In another example embodiment, a straight angled SMA wire can be used to drive motion of a parallelogram spring guiding structure. In such embodiments, the structure can include one or two straight SMA wires positioned at an angle. One angled straight SMA wire can drive motion upward, and another wire can drive motion downward. Some designs can have the two SMA wires on the same side.

Figure 18A:
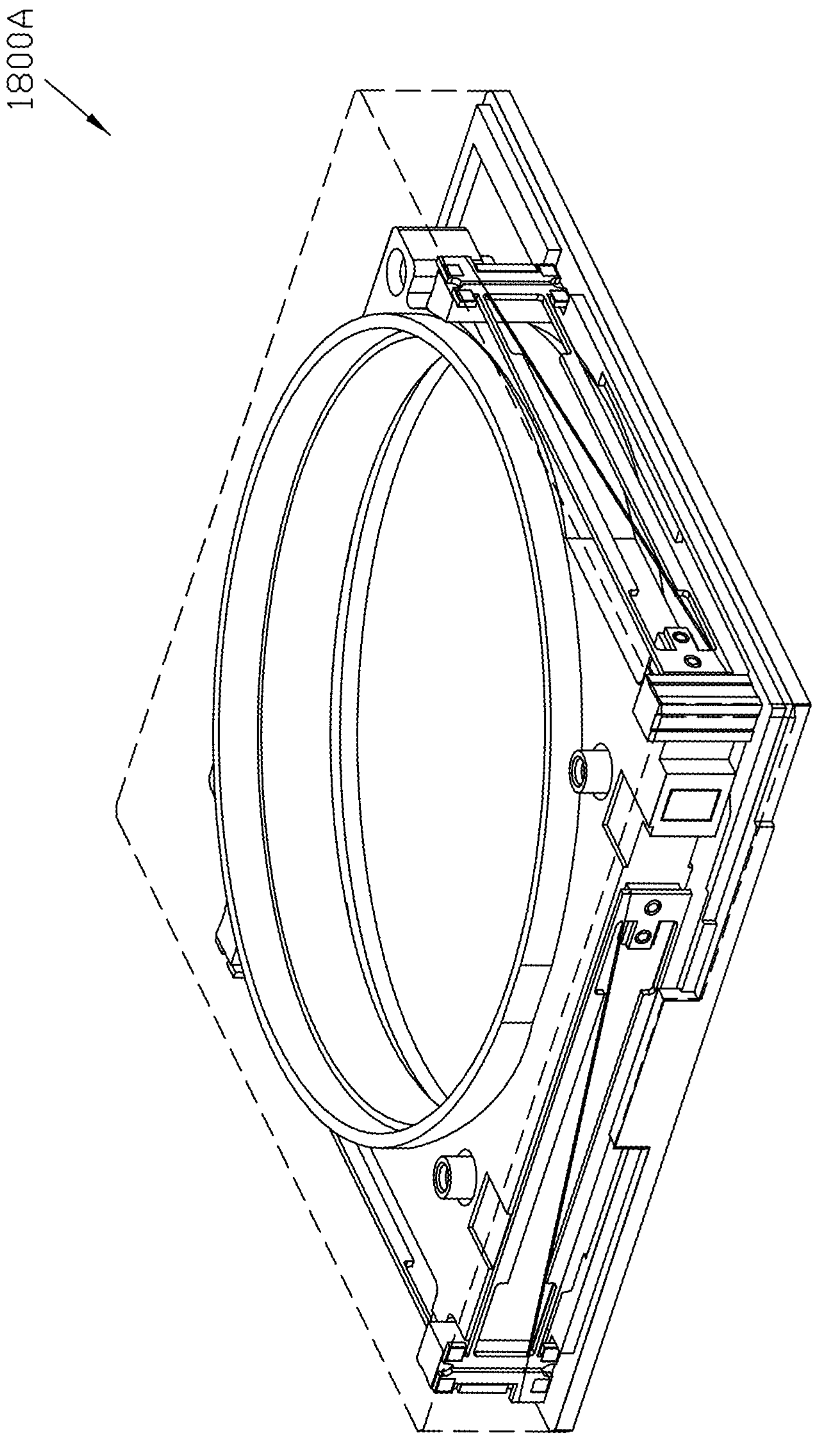
FIGS. 18A-B illustrate an example parallelogram spring guiding structure with straight angled SMA wires driving motion according to some embodiments.
Figure 18B:
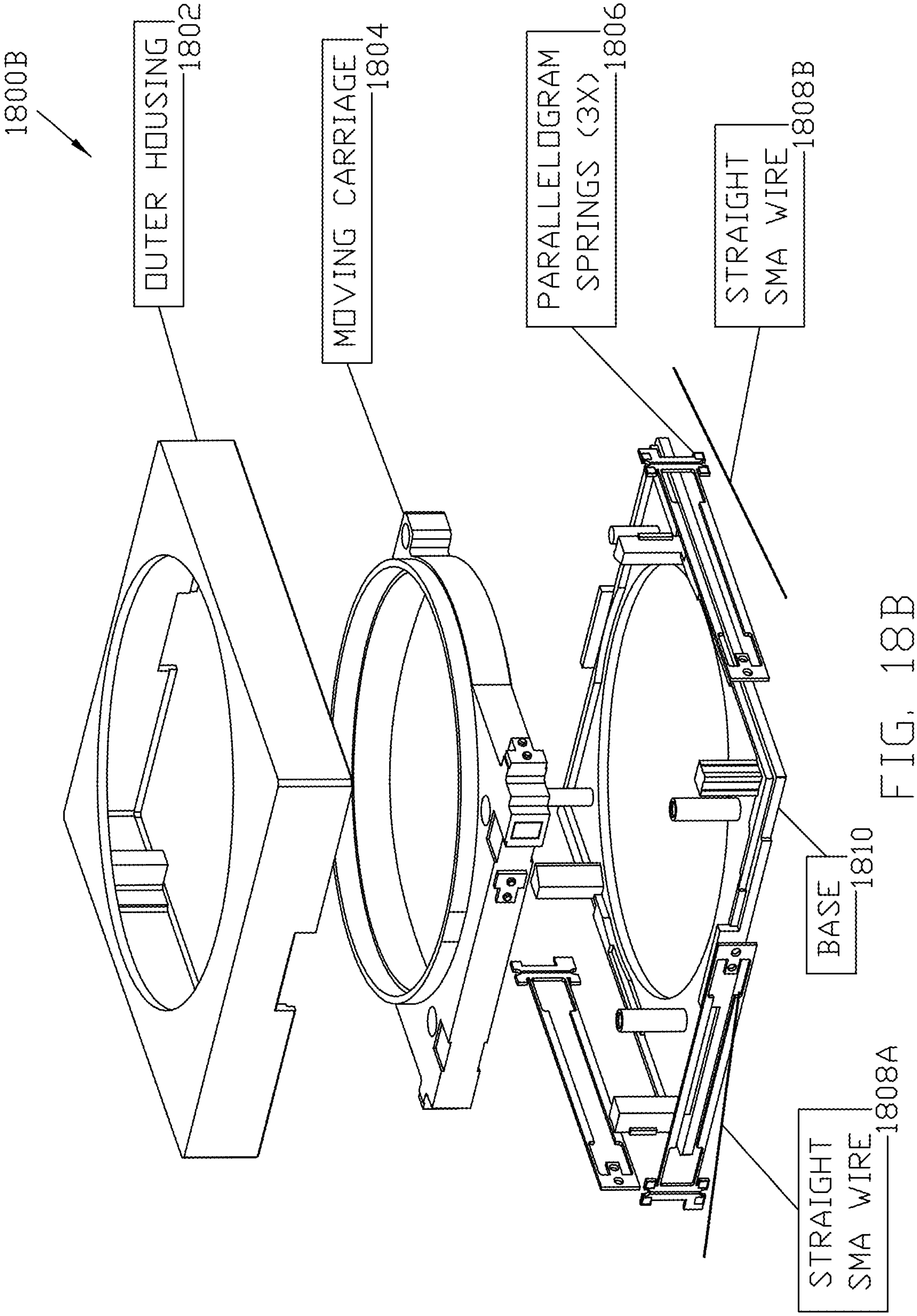

FIG. 18A-B illustrate an example parallelogram spring guiding structure 1800A-B with straight angled SMA wires driving motion. For instance, as shown in FIG. 18B, the structure can include an outer housing 1802, a moving carriage 1804, and a set of parallelogram springs 1806. Each parallelogram spring 1806 can be driven by a straight SMA wire 1808A-B. The structures 1806 can be affixed to a base 1810.

Each SMA wire can be affixed to the parallelogram spring guiding structure. Each Straight SMA wire can be positioned at an angle so that when heated will contract and the Z component of force will drive motion in that direction. An SMA wire can be attached at 2 ends to one of the parallelogram guiding springs. One side can be attached to the static side which can be electrically isolated to supply current to the SMA wire. The other side can be attached to the moving side of the spring. A driving circuit can attach to 2 pads on the parallelogram springs electrically isolated from each other with the SMA wire attached across both sides to force current through the SMA wire.

Figure 19:
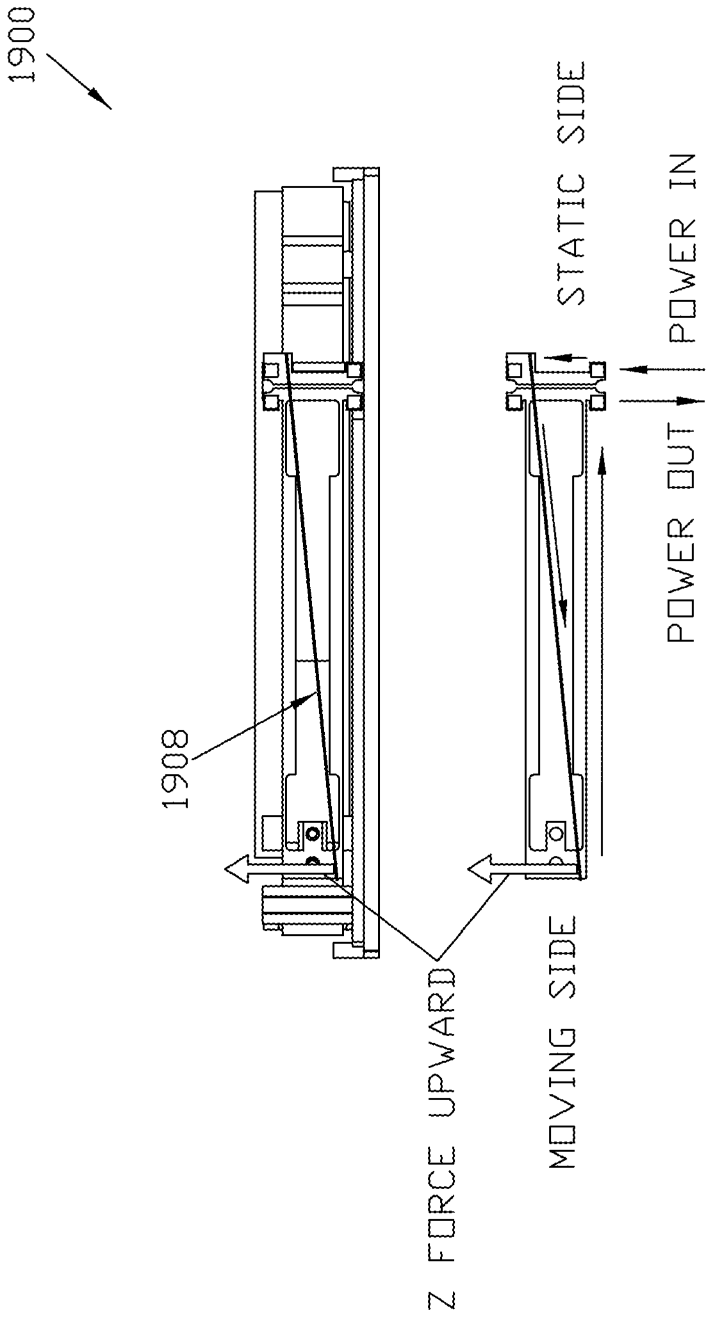
FIG. 19 illustrates example views of a motion and electrical path of a parallelogram spring guiding structure according to some embodiments.

FIG. 19 illustrates example views of a motion and electrical path of a parallelogram spring guiding structure 1900. For example, the SMA wire 1908 can be affixed to the structure and can move with a Z-force on a moving side of the structure. Further, power can be provided at a first point and move through the SMA wire and out at a second point.

Figure 20A:
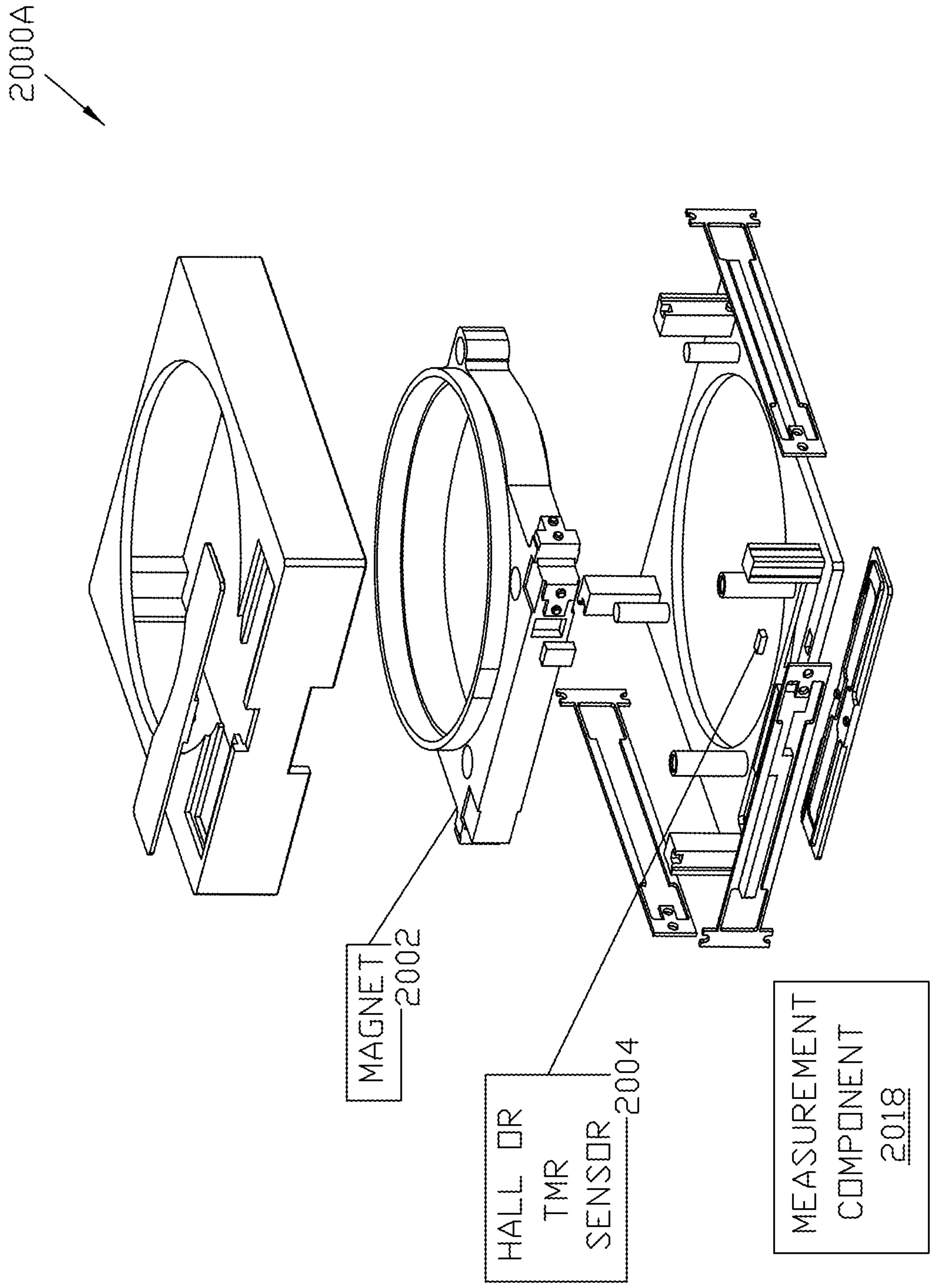
FIGS. 20A-C illustrate example views of an actuator with components to measure position of the actuator.
Figure 20B:
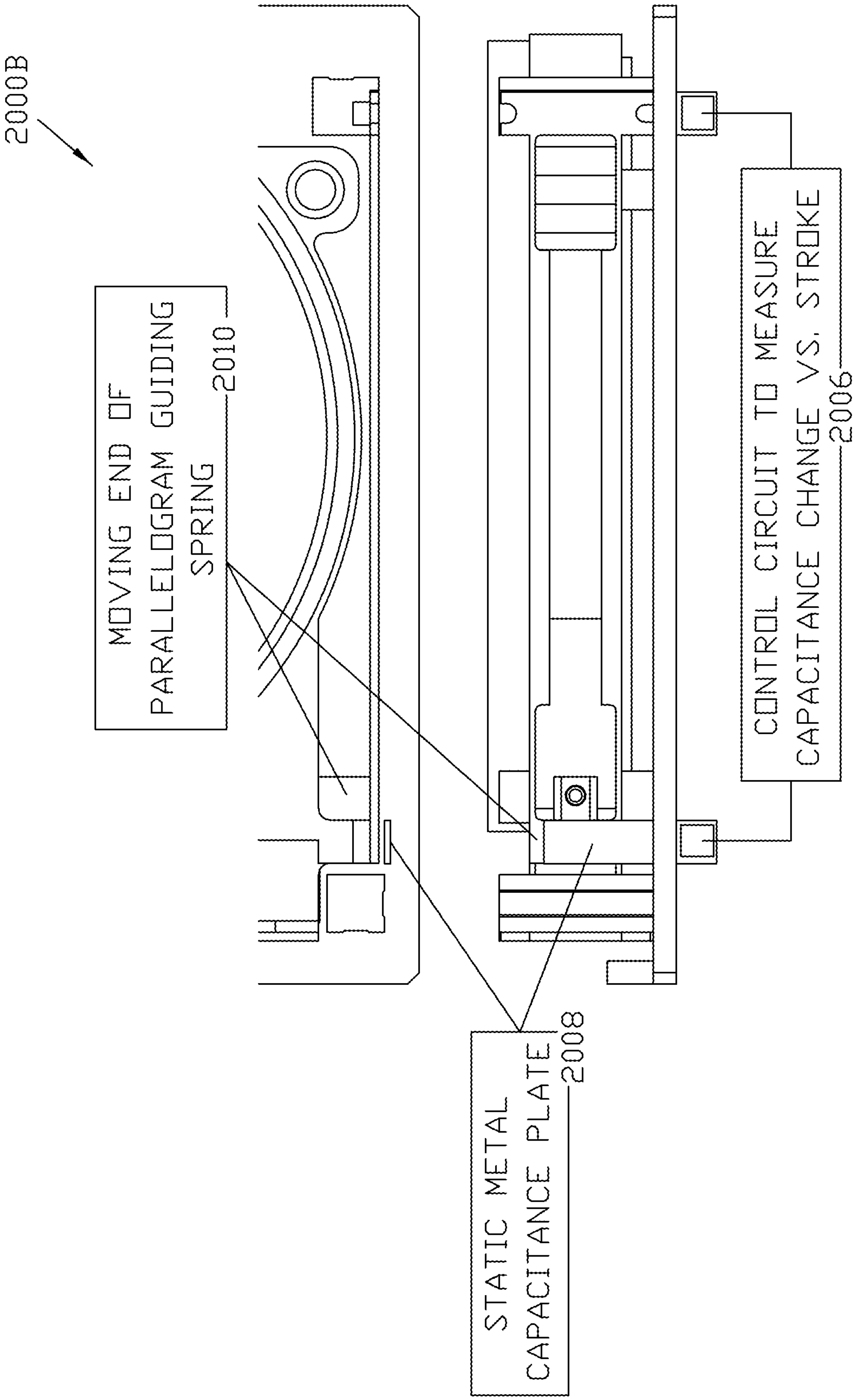
Figure 20C:
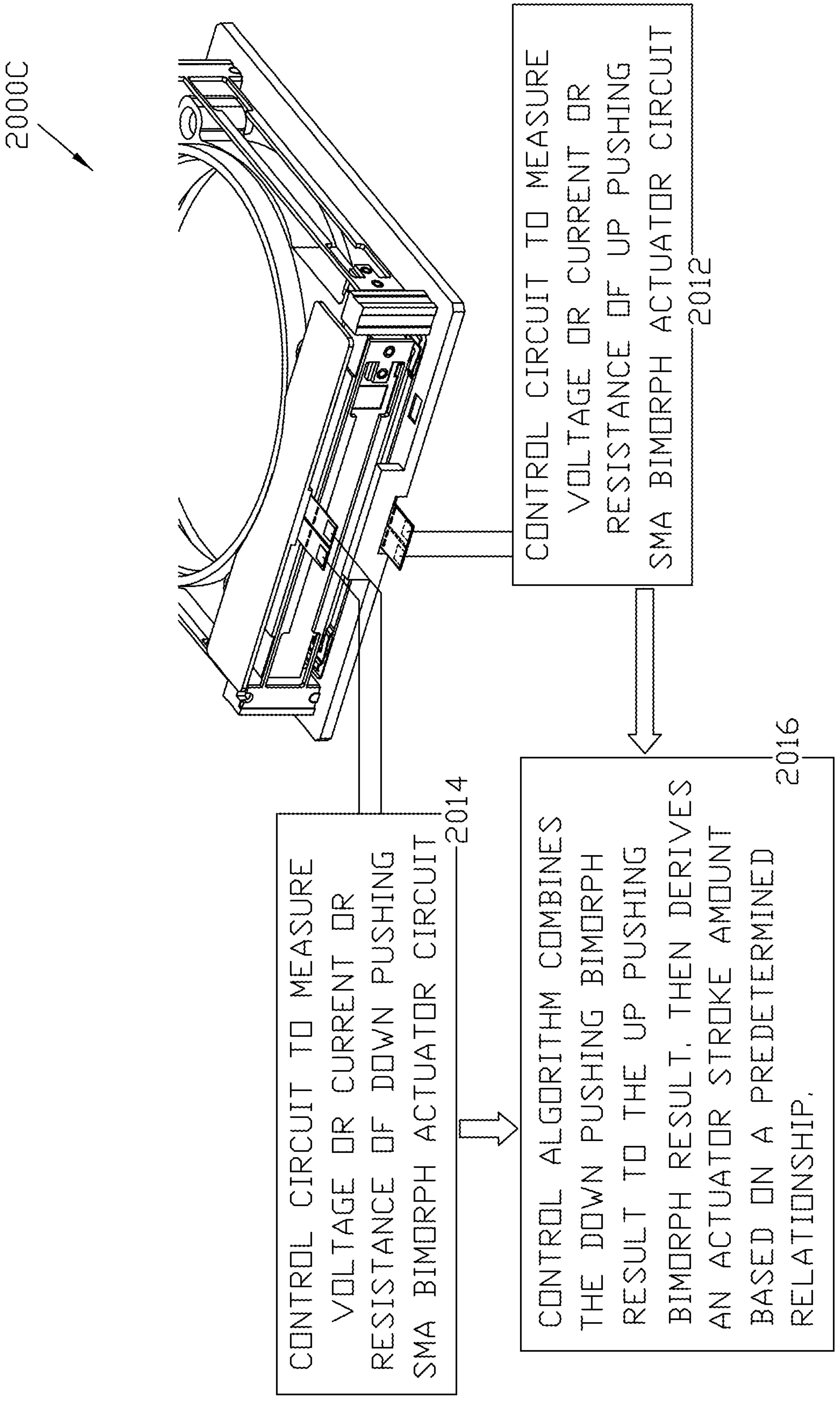

In some instances, one or more positioning sensors can be disposed as part of an actuator to detect and/or control a position of the actuator. FIGS. 20A-C illustrate example views of an actuator 2000A-C with components to measure position of the actuator. For example, changes in magnetic flux strength and/or direction can be measured by a hall element sensor or TMR (tunneling magnetoresistance) sensor. In FIG. 20A, the actuator 2000A can include a magnet 2002 and/or a hall or TMR sensor 2004. The actuator stroke can be derived based on a predetermined relationship between the magnet 2002 and sensor 2004.

For instance, a system as described herein can include a magnet disposed on a first side of the moving carriage and a sensor disposed on a second side of the moving carriage opposite the first side. The system can also include a measurement component 2018 configured to measure a change in magnetic flux strength and/or direction between the magnet and the sensor and determine a stroke position of the bimorph actuator. The measurement component 2016 can include a circuit, computing device, or other system capable of obtaining measurements from magnet 2002 and/or sensor 2004 and determine a position of the actuator.

Further, one or more of the parallelogram guiding springs can be used as part of the circuit for sensing the position of the moving carriage based on the capacitance change of circuit during stroke.

The actuator can include a static metal plate with a fixed gap from the moving end of the metal parallelogram spring. Further, control circuitry can measure capacitance change between 2 plates during motion and relate this to stroke amount. For instance, in FIG. 20B, a control circuit 2006 can measure a capacitance change vs. a stroke of the parallelogram guiding spring 2010 against a static metal capacitance plate 2008.

In some instances, the system can include a control circuit connected to both a capacitance plate at the second end of the first parallelogram guiding structure connected to the static base and at the first end of the first parallelogram guiding structure. The control circuit can be configured to measure a capacitance change in relation to a stroke position of the first parallelogram guiding structure. The control circuit can include a measurement component or a computing device capable to measure the capacitance change as described herein.

Further, some components can be either hidden or made transparent for clarity of bimorph actuators. For instance, a bimorph SMA circuit or both actuators can be used to determine stroke amount.

In FIG. 20C, a control circuit 2012 can be used to measure a voltage or current or resistance of an up pushing SMA bimorph actuator circuit. Another control circuit 2014 can be used to measure voltage, current, or resistance of a down pushing SMA bimorph actuator circuit. A control algorithm 2016 can combine the down pushing bimorph result to the up pushing bimorph result. Then, the algorithm can derive an actuator stroke amount based on a relationship between the measured metrics of each actuator.

In some instances, a system can include both a first bimorph actuator is disposed on a first side of the moving carriage a second bimorph actuator disposed at a second side of the moving carriage and configured to actuate in a direction opposite to that of the first bimorph actuator. The system can also include a first control circuit configured to measure a voltage, current, and/or resistance metric of the bimorph actuator and a second control circuit configured to measure a voltage, current, and/or resistance metric of the second bimorph actuator. The system can also include a measurement component configured to combine measured metrics from the first control circuit and the second control circuit and derive an actuator stroke amount of the bimorph actuator and the second bimorph actuator. The measurement component can implement a control algorithm (2016) as described herein.

According to some embodiments, the processes described herein are used to form one or more of any of mechanical structures and electro-mechanical structures.

Although described in connection with these embodiments, those of skill in the art will recognize that changes can be made in form and detail without departing from the spirit and scope of the invention.

What is claimed is:

1. A system comprising:

an actuator;

a moving carriage configured to move in response to actuation by the actuator;

a base configured to remain static; and a first parallelogram guiding structure comprising:

a first end connected to the moving carriage;

a second end connected to the static base; and a set of side lengths connecting the first end to the second end, wherein the first parallelogram guiding structure is configured to flex with the moving carriage such that an orientation of the first end remains substantially in parallel with an orientation of the second end.

2. The system of claim 1, wherein the first parallelogram guiding structure further comprises:

a set of flexible hinge areas formed between the set of side lengths and each of the first end and second end, wherein the flexible hinge areas are configured to flex as the moving carriage is actuated.

3. The system of claim 2, wherein the set of flexible hinge areas include a width less than a width of the set of side lengths.

4. The system of claim 1, wherein the first parallelogram guiding structure is disposed at a first side of the moving carriage and the static base, and wherein a second parallelogram guiding structure is disposed at a second side of the moving carriage and the static base.

5. The system of claim 1, wherein the first parallelogram guiding structure further comprises:

an inner spring and an outer spring, the inner spring including a first end of the inner spring that connects to the moving carriage and a second end of the inner spring that connects to a first end of the outer spring, and a second end of the outer spring connecting to the base, wherein the outer spring and the inner spring together provide multiple motion arcs as the moving carriage actuates.

6. The system of claim 1, wherein the moving carriage comprises a lens carriage configured to receive a lens as part of an autofocus system.

7. The system of claim 1, wherein the bimorph actuator comprises:

a beam including a first end fixed to the static base and a second end comprising a free end and connected to the moving carriage; and a shape metal alloy (SMA) material disposed along the beam between the fixed end and the free end.

8. The system of claim 1, further comprising three parallelogram spring structures each disposed on different sides of the moving carriage.

9. The system of claim 1, wherein a set of inlets are formed into each of the first end and the second end of the first parallelogram guiding structure.

10. The system of claim 1, further comprising:

the moving carriage comprising an upper lens carriage configured to hold a first lens, wherein the actuator is connected to the upper lens carriage; and a lower lens carriage configured to hold a second lens, wherein a second actuator is connected to the lower lens carriage, and wherein a stroke distance of the upper lens carriage is greater than a stroke distance of the lower lens carriage.

11. The system of claim 1, further comprising:

a magnet disposed on a first side of the moving carriage;

a sensor disposed on a second side of the moving carriage opposite the first side; and a measurement component configured to measure a change in magnetic flux strength and/or direction between the magnet and the sensor and determine a stroke position of the actuator.

12. The system of claim 1, further comprising:

a control circuit connected to both a capacitance plate at the second end of the first parallelogram guiding structure connected to the static base and at the first end of the first parallelogram guiding structure, wherein the control circuit is configured to measure a capacitance change in relation to a stroke position of the first parallelogram guiding structure.

13. The system of claim 1, wherein the actuator is disposed on a first side of the moving carriage, and wherein the system further comprises:

a second actuator disposed at a second side of the moving carriage and configured to actuate in a direction opposite to that of the actuator;

a first control circuit configured to measure a voltage or current or resistance metric of the actuator;

a second control circuit configured to measure a voltage or current or resistance metric of the second actuator; and a measurement component configured to combine measured metrics from the first control circuit and the second control circuit and derive an actuator stroke amount of the actuator and the second actuator.

14. A parallelogram guiding structure for an actuator, the parallelogram guiding structure comprising:

a first end configured to connect to a moving carriage;

a second end configured to connect to a static base;

a set of side lengths including first side length and a second side length that each extend between the first end to the second end; and a set of flex hinge areas formed between each of the set of side lengths and the first end and the second end, wherein the set of flex hinge areas are configured to flex as the first end moves with the moving carriage such that an orientation of the first end remains substantially in parallel with an orientation of the second end.

15. The parallelogram guiding structure of claim 14, wherein the set of flexible hinge areas include a width less than a width of the set of side lengths.

16. The parallelogram guiding structure of claim 14, wherein the parallelogram guiding structure further comprises:

an inner spring and an outer spring, the inner spring including a first end of the inner spring that connects to the moving carriage and a second end of the inner spring that connects to a first end of the outer spring, and a second end of the outer spring connecting to the base, wherein the outer spring and the inner spring together provide multiple motion arcs as the moving carriage actuates.

17. The parallelogram guiding structure of claim 14, wherein a set of inlets are formed into each of the first end and the second end of the parallelogram guiding structure.

18. A device comprising:

a moving carriage configured to move in response to actuation by an actuator;

a base configured to remain static;

an outer parallelogram guiding structure comprising:

a first end connected to the moving carriage;

a second end connected to the static base; and a set of side lengths connecting the first end to the second end; and an inner parallelogram guiding structure comprising:

a first end connected to the outer parallelogram guiding structure at the second end of the outer parallelogram guiding structure;

a second end connected to a static endpoint; and a set of side lengths disposed between the first end and the second end.

19. The device of claim 18, wherein the inner parallelogram guiding structure and the outer parallelogram guiding structure further comprise:

a set of flexible hinge areas formed between the set of side lengths and each of the first end and second end of each of the inner parallelogram guiding structure and the outer parallelogram guiding structure, wherein the flexible hinge areas are configured to flex as the moving carriage is actuated.

20. The device of claim 19, wherein the set of flexible hinge areas include a width less than a width of the set of side lengths.

21. The device of claim 18, wherein a first set of the inner parallelogram guiding structure and the outer parallelogram guiding structure is disposed at a first side of the moving carriage and the static base, and wherein a second set of the inner parallelogram guiding structure and the outer parallelogram guiding structure is disposed at a second side of the moving carriage and the static base.

22. The device of claim 18, wherein the moving carriage comprises a lens carriage configured to receive a lens as part of an autofocus system.

23. The device of claim 18, wherein a set of inlets are formed into each of the first end and the second end of each of the inner parallelogram guiding structure and the outer parallelogram guiding structure.

24. A system comprising:

a bimorph actuator;

a moving carriage configured to move in response to actuation by the bimorph actuator;

a base configured to remain static; and a first parallelogram guiding structure comprising:

a first end connected to the moving carriage;

a second end connected to the static base;

a set of side lengths connecting the first end to the second end; and a shape memory alloy (SMA) wire with a first end of the SMA wire disposed at the first end of the first parallelogram guiding structure and a second end of the SMA wire disposed at the second end of the first parallelogram guiding structure.

25. The system of claim 24, wherein the SMA wire is affixed to the first parallelogram guiding structure at an angle relative to the set of side lengths.

26. The system of claim 24, wherein the first parallelogram guiding structure is disposed at a first side of the moving carriage and the static base, and wherein a second parallelogram guiding structure is disposed at a second side of the moving carriage and the static base, wherein the second parallelogram guiding structure includes a second SMA wire disposed between a first end and a second end of the second parallelogram guiding structure.

* * * * *